(12) United States Patent
Dally et al.

(10) Patent No.: US 7,401,205 B1
(45) Date of Patent: Jul. 15, 2008

(54) HIGH PERFORMANCE RISC INSTRUCTION SET DIGITAL SIGNAL PROCESSOR HAVING CIRCULAR BUFFER AND LOOPING CONTROLS

(75) Inventors: William J. Dally, Stanford, CA (US); W. Patrick Hays, Cambridge, MA (US); Robert Gelinas, Needham, MA (US); Sol Katzman, Waltham, MA (US); Sam Rosen, Los Angeles, CA (US); Staffan Ericsson, Brookline, MA (US)

(73) Assignee: MIPS Technologies, Inc., Mountain View, CA (US)

( * ) Notice: Subject to any disclaimer, the term of this patent is extended or adjusted under 35 U.S.C. 154(b) by 899 days.

(21) Appl. No.: 09/637,500

(22) Filed: Aug. 11, 2000

Related U.S. Application Data

(60) Provisional application No. 60/148,652, filed on Aug. 13, 1999.

(51) Int. Cl.
*G06F 15/80* (2006.01)
*G06F 15/00* (2006.01)

(52) U.S. Cl. ........................ 712/35; 712/241

(58) Field of Classification Search ............ 712/32–35, 712/41, 205, 206, 22–24, 246, 247, 241
See application file for complete search history.

(56) References Cited

U.S. PATENT DOCUMENTS

| | | | | |
|---|---|---|---|---|
| 4,218,753 A | * | 8/1980 | Hendrie | 365/222 |
| 4,709,324 A | * | 11/1987 | Kloker | 712/207 |
| 4,766,566 A | * | 8/1988 | Chuang | 712/23 |
| 5,446,651 A | * | 8/1995 | Moyse et al. | 708/630 |
| 5,459,843 A | * | 10/1995 | Davis et al. | 712/23 |
| 5,465,224 A | * | 11/1995 | Guttag et al. | 708/236 |
| 5,481,736 A | * | 1/1996 | Schwartz et al. | 712/23 |
| 5,497,465 A | * | 3/1996 | Chin et al. | 710/100 |
| 5,638,524 A | * | 6/1997 | Kiuchi et al. | 712/221 |
| 5,644,780 A | * | 7/1997 | Luick | 712/23 |
| 5,717,947 A | * | 2/1998 | Gallup et al. | 712/3 |
| 5,781,750 A | * | 7/1998 | Blomgren et al. | 712/209 |
| 5,864,703 A | | 1/1999 | van Hook et al. | |
| 5,933,650 A | | 8/1999 | van Hook et al. | |
| 5,974,483 A | * | 10/1999 | Ray et al. | 710/52 |
| 6,157,988 A | * | 12/2000 | Dowling | 711/140 |
| 6,185,634 B1 | * | 2/2001 | Wilcox | 710/26 |
| 6,266,758 B1 | | 7/2001 | van Hook et al. | |

(Continued)

OTHER PUBLICATIONS

Gwennap, L., "Digital, MIPS Add Multimedia Extensions: Digitial Focuses on Video, MIPS on 3D Graphics; Vendors Debate Differences," *Microprocessor Report*, vol. 10, No. 15, pp. 1-5 (Nov. 18, 1996).

(Continued)

*Primary Examiner*—Fritz Fleming
*Assistant Examiner*—Jesse R. Moll
(74) *Attorney, Agent, or Firm*—Sterne, Kessler, Goldstein & Fox PLLC

(57) ABSTRACT

A DSP superscalar architecture employing dual multiply accumulate pipelines. Dual MAC pipelines allow for a seem less transition between established RISC instruction sets and extended DSP instructions sets. Relocatable opcodes are provide to allow further extensions of RISC instruction sets. The DSP superscalar architecture also provides memory pointers with hardware circular buffer support, an interruptible and nested zero-overhead loop counter, and prioritized low-overhead interrupts.

10 Claims, 33 Drawing Sheets

U.S. PATENT DOCUMENTS

| | | | |
|---|---|---|---|
| 6,298,366 B1 * | 10/2001 | Gatherer et al. | 708/523 |
| 6,308,252 B1 * | 10/2001 | Agarwal et al. | 712/22 |
| 6,480,947 B1 * | 11/2002 | Hasegawa et al. | 711/167 |
| 2002/0062436 A1 | 5/2002 | van Hook et al. | |
| 2006/0129787 A1 | 6/2006 | van Hook et al. | |

OTHER PUBLICATIONS

Gwennap, L., "New Multimedia Chips to Enter the Fray: Media Processors, Multimedia-Enhanced CPUs Debut at Microprocessor Forum, " *Microprocessor Report*, vol. 10, No. 13, 1 page (Oct. 7, 1996).

Killian, E., "MIPS Extensions for Digital Media, " *Microprocessor Forum*, pp. 1-5 (Oct. 22-23, 1996).

van Hook, T.J. et al., U.S. Patent Appl. No. 09/662,832, entitled "Alignment and Ordering of Vector Elements for Single Instruction Multiple Data Processing," 60 pages, as filed Sep. 15, 2000.

* cited by examiner

INSTRUCTION SELECT LOGIC 300

0eA : 0eB

| 1eA:1eB | | 00 (I0 NOT VALID) | 01 | 11 | 10 |
|---|---|---|---|---|---|
| | 00 (I1 NOT VALID) | IA→NOP<br>IB→NOP<br>ORD→d/c<br>V[1:0]→NEXT | NOT POSSIBLE | NOT POSSIBLE | NOT POSSIBLE |
| | 01 | IA→NOP<br>IB→11<br>ORD→B<br>V[1:0]→NEXT | IA→NOP<br>IB→10<br>STALL→1<br>ORD→B<br>V[1:0]→01 | IA→10<br>IB→11<br>ORD→A<br>V[1:0]→NEXT | IA→10<br>IB→11<br>ORD→A<br>V[1:0]→NEXT |
| | 11 | IA→NOP<br>IB→11<br>ORD→B<br>V[1:0]→NEXT | IA→11<br>IB→10<br>ORD→B<br>V[1:0]→NEXT | IA→10<br>IB→11<br>ORD→A<br>V[1:0]→NEXT | IA→10<br>IB→11<br>ORD→A<br>V[1:0]→NEXT |
| | 10 | IA→11<br>IB→NOP<br>ORD→A<br>V[1:0]→NEXT | IA→11<br>IB→10<br>ORD→B<br>V[1:0]→NEXT | IA→11<br>IB→10<br>ORD→B<br>V[1:0]→NEXT | IA→10<br>IB→NOP<br>STALL→1<br>ORD→A<br>V[1:0]→01 |
| | 1d0 | NOT POSSIBLE | IA→NOP<br>IB→10<br>STALL→1<br>ORD→B<br>V[1:0]→01 | IA→10<br>IB→NOP<br>STALL→1<br>ORD→A<br>V[1:0]→01 | IA→10<br>IB→NOP<br>STALL→1<br>ORD→A<br>V[1:0]→01 |

*NOTE: I0 VALID AND I1 NOT VALID WON'T OCCUR BECAUSE THERE IS NO OUT OF ORDER EXECUTION.

FIG. 3

- Integer format interpretation:

X = | S | 14 | 13 | 12 | --- | 0 |
               ^
          (radix point)

$$X = -2^{15} \times S + \sum_{0}^{14} X[i] 2^i$$

- Product=P[31:0] is sign-extended to P[39:0]=P[31]$^8$ ‖ P[31:0] for accumulation P = | S | 30 | 29 | 28 | --- | 0 |
                       ^
                  (radix point)

$$P = -2^{31} \times S + \sum_{0}^{30} X[i] 2^i$$

- Fractional format interpretation:

X = | S | 14 | 13 | 12 | --- | 0 |
       ^
   (radix point)

$$X = -1 \times S + \sum_{0}^{14} X[i] 2^{i-15}$$

Product=P[31:0] is left-shifted one bit and sign-extended to:
P[39:0]=P[30]$^8$ ‖ P[30:0] ‖ 0 for accumulation P = | S | 29 | 28 | 27 | --- | zero |
       ^
(radix point and product left shifted by one)

$$P = -1 \times S + \sum_{0}^{29} P[i] 2^{i-30}$$

FIG. 7A

OVERFLOW PROTECTION: GUARD BITS AND SATURATION

- THE LX5280 ACCUMULATOR IMPLEMENTS EIGHT (8) GUARD BITS TO PROTECT AGAINST OVERFLOW. THE ALTERNATIVES OF (i) PRODUCT SCALING OR (ii) INPUT SCALING BY RIGHT SHIFTING, CAUSE LOSS OF PRECISION.

- OPTIONAL SATURATION (MADDA2.S, MSUBA2.S, SUBMA.S) CAN BE USED TO AVOID WRAP-AROUND ON UNDERFLOW OR OVERFLOW OF THE 40-BIT FORMAT (OR 32-BITS IF THAT MODE IS SELECTED IN THE MMD REGISTER):

IF (RESULT>0 1 1 1 1...1) RESULT=0 1 1 1 1 1...1

IF (RESULT<1 0 0 0 0...0) RESULT=1 0 0 0 0...0

- IN 32-BIT SATURATE MODE, THE MAC IMPLEMENTS A FULL 40-BIT SATURATION DETECTOR. THIS ALLOWS FOR THE CASE WHERE THE ACCUMULATOR HOLDS A VALUE GREATER THAN THE MAXIMUM 32-BIT SATURATED VALUE PRIOR TO THE ADDITION (OR SUBTRACTION) WITH SATURATION.

FIG.7B

MAC OUTPUT CONTROL: ROUNDING AND SCALING

- FOR OUTPUT STORAGE, THE 40-BIT ACCUMULATORS MUST BE CONVERTED TO 16-BIT OR 32-BIT FORMAT.

- SCALING

SINGLE ACCUMULATOR:

RES[31:0] ⟶ {mTh, mTℓ} [31+n:n]     [n=0-8]

DUAL ACCUMULATORS (SELECT HIGH HALF OF EACH, USEFUL FOR FRACTIONAL ARITHMETIC RESULTS):

RES[31:0] ⟶ mTh [31 + n:16 + n] || mTℓ [31 + n:16 + n][n=0-8]     [n=0-8]

- TO AVOID THE BIAS INTRODUCED BY TRUNCATION, THE ACCUMULATOR CAN BE ROUNDED PRIOR TO OUTPUT SCALING (USEFUL FOR FRACTIONAL ARITHMETIC RESULTS).

{mT, mTh, mTℓ} ⟶ RNDA2 {mT, mTh, mTℓ}

⟹ THE ROUNDING MODE IS SELECTABLE IN THE MMD REGISTER

BIT POSITION 16+n OF EACH ACCUMULATOR IN THE PAIR IS THE LEAST SIGNIFICANT BIT OF PRECISION AFTER ROUNDING

FIG.7C

MAC RADIAX INSTRUCTION SUMMARY

| INSTRUCTION | SYNTAX AND DESCRIPTION |
|---|---|
| DUAL MOVE TO ACCUMULATOR | MTA2 [.G]   rS, {mD, mDh, mDℓ}<br>IF MTA2, AND mDh(mDℓ) IS SELECTED, SIGN-EXTEND THE CONTENTS OF GENERAL REGISTER rS TO 40-BITS AND MOVE TO ACCUMULATOR REGISTER mDh(mDℓ). IF MTA2, AND mD IS SELECTED, UPDATE BOTH mDh AND mDℓ WITH 40-BIT, SIGN-EXTENDED CONTENTS OF THE SAME rS. IF MTA2.G IS SELECTED, THE ACCUMULATOR REGISTER BITS [39:32] ARE UPDATED WITH rS [31:24]; BITS [31:00] OF THE ACCUMULATOR ARE UNCHANGED. (THE .G OPTION IS USED TO RESTORE THE UPPER-BITS OF THE ACCUMULATOR FROM THE GENERAL REGISTER FILE; TYPICALLY, FOLLOWING AN EXCEPTION.) |
| MOVE FROM ACCUMULATOR | MFA   rD, {mTh, mTℓ} [,n]<br>MOVE THE CONTENTS OF ACCUMULATOR REGISTER mTh OR ACCUMULATOR REGISTER mTℓ TO REGISTER rD WITH OPTIONAL RIGHT SHIFT. BITS [31+n:n] FROM THE ACCUMULATOR REGISTER ARE TRANSFERRED TO rD[31:00]. THE RANGE n=0-8 IS PERMITTED FOR THE OUTPUT ALIGNMENT SHIFT AMOUNT. IN THE CASE OF n=0, THE FIELD MAY BE OMITTED. |
| DUAL MOVE FROM ACCUMULATOR | MFA2   rD, mT [,n]<br>MOVE THE CONTENTS OF THE UPPER HALVES OF ACCUMULATOR REGISTER PAIR mT TO REGISTER rD WITH OPTIONAL RIGHT SHIFT. THE rD[31:16] ARE TAKEN FROM mTH AND rD[15:00] FROM THE CORRESPONDING mTℓ. mTh[31+n: 16+n] \|\| mTℓ[31+n: 16+n] FROM THE ACCUMULATOR REGISTER PAIR ARE TRANSFERRED TO rD[31:00]. THE RANGE n=0-8 IS PERMITTED FOR THE OUTPUT ALIGNMENT SHIFT AMOUNT. IN THE CASE OF n=0, THE FIELD MAY BE OMITTED. |
| DIVIDE | DIVA   mD, rS, rT<br>THE CONTENTS OF REGISTER rS IS DIVIDED BY rT, TREATING THE OPERANDS AS SIGNED 2's COMPLEMENT VALUES. THE REMAINDER IS SIGN-EXTENDED TO 40-BITS AND STORED IN mDh AND THE QUOTIENT IS SIGN-EXTENDED TO 40-BITS AND STORED IN mDℓ. m0h[31:00] IS ALSO CALLED HI. m0ℓ[31:00] IS ALSO CALLED LO. |
| DIVIDE UNSIGNED | DIVAU   mD, rS, rT<br>THE CONTENTS OF REGISTER rS IS DIVIDED BY rT, TREATING THE OPERANDS AS UNSIGNED VALUES. THE REMAINDER IS ZERO-EXTENDED TO 40-BITS AND STORED IN mDh AND THE QUOTIENT IS ZERO-EXTENDED TO 40-BITS AND STORED IN mDℓ. m0h[31:00] IS ALSO CALLED HI. m0ℓ[31:00] IS ALSO CALLED LO. |
| MULTIPLY (32-BIT) | MULTA   mD, rS, rT<br>THE CONTENTS OF REGISTER rS IS MULTIPLIED BY rT, TREATING THE OPERANDS AS SIGNED 2's COMPLEMENT VALUES. THE UPPER 32-BITS OF THE 64-BIT PRODUCT IS SIGN-EXTENDED TO 40-BITS AND STORED IN mDh AND THE LOWER 32-BITS IS ZERO-EXTENDED TO 40-BITS AND STORED IN THE CORRESPONDING mDl. m0h[31:00] IS ALSO CALLED HI. m0ℓ[31:00] IS ALSO CALLED LO. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE PRODUCT IS LEFT SHIFTED BY ONE BIT, AND FURTHERMORE, IF BOTH OPERANDS ARE -1 THEN THE PRODUCT IS SET TO POSITIVE SIGNED, ALL ONES FRACTION, PRIOR TO THE SHIFT. IF BOTH MMD[MT]AND MMD[MF] ARE 1, THE RESULT IS UNDEFINED. |

FIG.8A

| INSTRUCTION | SYNTAX AND DESCRIPTION |
|---|---|
| MULTIPLY UNSIGNED (32-BIT) | *MULTAU     mD, rS, rT*<br>THE CONTENTS OF REGISTER rS IS MULTIPLIED BY rT, TREATING THE OPERANDS AS UNSIGNED VALUES. THE UPPER 32-BITS OF THE 64-BIT PRODUCT IS ZERO-EXTENDED TO 40-BITS AND STORED IN mDh AND THE LOWER 32-BITS IS ZERO-EXTENDED TO 40-BITS AND STORED IN THE CORRESPONDING mDl. mDh[31:00] IS ALSO CALLED HI. mDl[31:00] IS ALSO CALLED LO. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE RESULT IS UNDEFINED. |
| DUAL MULTIPLY (16-BIT) | *MULTA2     {mD, mDh, mDl}, rS, rT*<br>THE CONTENTS OF REGISTER rS IS MULTIPLIED BY rT, TREATING THE OPERANDS AS SIGNED 2's COMPLEMENT VALUES. IF THE DESTINATION REGISTER IS mDh, rS[31:16] IS MULTI-PLIED BY rT[31:16] AND THE PRODUCT IS SIGN-EXTENDED TO 40-BITS AND STORED IN mDh. IF THE DESTINATION REGISTER IS mDl, rS[15:00] IS MULTIPLIED BY rT[15:00] AND THE PRODUCT IS SIGN-EXTENDED TO 40-BITS AND STORED IN mDl. IF THE DESTINATION IS mD, BOTH OPERATIONS ARE PERFORMED AND THE TWO PRODUCTS ARE STORED IN THE ACCUMULATOR REGISTER PAIR mD. IF MMD[MF] IS 1, THEN EACH PRODUCT IS LEFT SHIFTED BY ONE BIT, AND FURTHERMORE, FOR EACH MULTIPLY, IF BOTH OPERANDS ARE −1 THEN THE PRODUCT IS SET TO POSITIVE SIGNED, ALL ONES FRACTION. |
| DUAL MULTIPLY AND NEGATE (16-BIT) | *MULNA2     {mD, mDh, mDl}, rS, rT*<br>THE CONTENTS OF REGISTER rS IS MULTIPLIED BY rT, TREATING THE OPERANDS AS SIGNED 2's COMPLEMENT VALUES. IF THE DESTINATION REGISTER IS mDh, rS[31:16] IS MULTI-PLIED BY rT[31:16] AND THE PRODUCT IS SIGN-EXTENDED TO 40-BITS, NEGATED (I.E. SUBTRACTED FROM ZERO) AND STORE IN mDh. IF THE DESTINATION REGISTER IS mDl, rS[15:00] IS MULTIPLIED BY rT[15:00] AND THE PRODUCT IS SIGN-EXTENDED TO 40-BITS, NEGATED (I.E. SUBTRACTED FROM ZERO) AND STORED IN mDl. IF THE DESTINATION IS mD, BOTH OPERATIONS ARE PERFORMED AND THE TWO PRODUCTS ARE STORED IN THE ACCU-MULATOR REGISTER PAIR mD. IF MMD[MF] IS 1, THEN EACH PRODUCT IS LEFT SHIFTED BY ONE BIT PRIOR TO SIGN-EXTENSION AND NEGATION, AND FURTHERMORE, FOR EACH MULTI-PLY, IF BOTH OPERANDS ARE −1 THEN THE PRODUCT IS SET TO POSITIVE SIGNED, ALL ONES FRACTION PRIOR TO SIGN-EXTENSION AND NEGATION. |
| COMPLEX MULTIPLY, | *CMULTA     mD, rS, rT*<br>rS[31:16] IS INTERPRETED AS THE REAL PART OF A COMPLEX NUMBER. rS[15:00] IS INTER-PRETED AS THE IMAGINARY PART OF THE SAME COMPLEX NUMBER. SIMILARLY FOR THE CONTENTS OF GENERAL REGISTER rT. AS THE RESULT OF CMULTA, mDh IS UPDATED WITH THE REAL PART OF THE PRODUCT, SIGN-EXTENDED TO 40-BITS AND mDl IS UPDATED WITH THE IMAGINARY PART OF THE PRODUCT, SIGN-EXTENDED TO 40-BITS. IF MMD[MF] IS 1, THEN EACH PRODUCT IS LEFT SHIFTED BY ONE BIT, AND FURTHERMORE, FOR EACH MULTIPLY, IF BOTH OPERANDS ARE −1 THEN THE PRODUCT IS SET TO POSITIVE SIGNED, ALL ONES FRAC-TION, PRIOR TO THE ADDITION OF TERMS. |

FIG.8B

| INSTRUCTION | SYNTAX AND DESCRIPTION |
|---|---|
| 32-BIT MULTIPLY-ADD WITH 72-BIT ACCUMULATE | MADDA      mD, rS, rT<br>THE CONTENTS OF REGISTER rS IS MULTIPLIED BY rT TREATING THE OPERANDS AS SIGNED 2's COMPLEMENT VALUES. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE PRODUCT IS LEFT SHIFTED BY ONE BIT, AND FURTHERMORE, IF BOTH OPERANDS ARE −1 THEN THE PRODUCT IS SET TO A POSITIVE SIGNED, ALL ONES FRACTION. IF BOTH MMD[MT] AND MMD[MF] ARE 1, THEN THE RESULT OF THE MULTIPLY IS UNDEFINED.<br>THE 64-BIT PRODUCT IS SIGN-EXTENDED TO 72-BITS AND ADDED TO THE CONCATENATION mDh[39:0] ‖ mDℓ[31:0], IGNORING mDℓ[39:32]. THE LOWER 32 BITS OF THE RESULT ARE ZERO-EXTENDED TO 40-BITS AND STORED INTO mDℓ. THE UPPER 40-BITS OF THE RESULT ARE STORED INTO mDh. |
| 32-BIT UNSIGNED MULTIPLY-ADD WITH 72-BIT ACCUMULATE | MADDAU      mD, rS, rT<br>THE CONTENTS OF REGISTER rS IS MULTIPLIED BY rT TREATING THE OPERANDS AS UNSIGNED VALUES. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE RESULT OF THE MULTIPLY IS UNDEFINED.<br>THE 64-BIT PRODUCT IS ZERO-EXTENDED TO 72-BITS AND ADDED TO THE CONCATENATION mDh[39:0] ‖ mDℓ[31:0], IGNORING mDℓ[39:32]. THE LOWER 32 BITS OF THE RESULT ARE ZERO-EXTENDED TO 40-BITS AND STORED INTO mDℓ. THE UPPER 40-BITS OF THE RESULT ARE STORED INTO mDh. |
| DUAL MULTIPLY-ADD, OPTIONAL SATURATION | MADDA2[.S]      {mD, mDh, mDℓ}, rS, rT<br>THE CONTENTS OF REGISTER rS IS MULTIPLIED BY rT AND ADDED TO AN ACCUMULATOR REGISTER, TREATING THE OPERANDS AS SIGNED 2's COMPLEMENT VALUES. IF THE DESTINATION REGISTER IS mDh, rS[31:16] IS MULTIPLIED BY rT[31:16] THEN SIGN-EXTENDED AND ADDED TO mDh[39:00]. IF THE DESTINATION REGISTER IS mDℓ, rS[15:00] IS MULTIPLIED BY rT[15:00] THEN SIGN-EXTENDED AND ADDED TO mDℓ[39:00]. IF THE DESTINATION IS mD, BOTH OPERATIONS ARE PERFORMED AND THE TWO RESULTS ARE STORED IN THE ACCUMULATOR REGISTER PAIR mD. IF MADDA2.S THE RESULT OF EACH ADDITION IS SATURATED BEFORE STORAGE IN THE ACCUMULATOR REGISTER. THE MULTIPLIES ARE SUBJECT TO MMD[MF] AS IN MULTA2. THE SATURATION POINT IS SELECTED AS EITHER 40 OR 32 BITS BY MMD[MS]. |
| 32-BIT MULTIPLY-SUBTRACT WITH 72-BIT ACCUMULATE | MSUBA      mD, rS, rT<br>THE CONTENTS OF REGISTER rS IS MULTIPLIED BY rT TREATING THE OPERANDS AS SIGNED 2's COMPLEMENT VALUES. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE PRODUCT IS LEFT SHIFTED BY ONE BIT, AND FURTHERMORE, IF BOTH OPERANDS ARE −1 THEN THE PRODUCT IS SET TO A POSITIVE SIGNED, ALL ONES FRACTION. IF BOTH MMD[MT] AND MMD[MF] ARE 1, THEN THE RESULT OF THE MULTIPLY IS UNDEFINED.<br>THE 64-BIT PRODUCT IS SIGN-EXTENDED TO 72-BITS AND SUBTRACTED FROM THE CONCATENATION mDh[39:0] ‖ mDℓ[31:0], IGNORING mDℓ[39:32]. THE LOWER 32 BITS OF THE RESULT ARE ZERO-EXTENDED TO 40-BITS AND STORED INTO mDℓ. THE UPPER 40-BITS OF THE RESULT ARE STORED INTO mDh. |

FIG.8C

| INSTRUCTION | SYNTAX AND DESCRIPTION |
|---|---|
| 32-BIT UNSIGNED MULTIPLY-SUBTRACT WITH 72-BIT ACCUMULATE | *MSUBAU    mD, rS, rT*<br>THE CONTENTS OF REGISTER rS IS MULTIPLIED BY rT TREATING THE OPERANDS AS UNSIGNED VALUES. IF MMD[MT] IS 1, THEN THE PARTIAL PRODUCT rS[15:00] x rT[15:00] IS NOT INCLUDED IN THE TOTAL PRODUCT. IF MMD[MF] IS 1, THEN THE RESULT OF THE MULTIPLY IS UNDEFINED.<br>THE 64-BIT PRODUCT IS ZERO-EXTENDED TO 72-BITS AND SUBTRACTED FROM THE CONCATENATION mDh[39:0] ‖ mDℓ[31:0], IGNORING mDℓ[39:32]. THE LOWER 32 BITS OF THE RESULT ARE ZERO-EXTENDED TO 40-BITS AND STORED INTO mDℓ. THE UPPER 40-BITS OF THE RESULT ARE STORED INTO mDh. |
| DUAL MULTIPLY-SUB, OPTIONAL SATURATION | *MSUBA2[.S]    {mD, mDH, mDℓ}, rS, rT*<br>THE CONTENTS OF REGISTER rS IS MULTIPLIED BY rT AND SUBTRACTED FROM AN ACCUMULATOR REGISTER, TREATING THE OPERANDS AS SIGNED 2's COMPLEMENT VALUES. IF THE DESTINATION REGISTER IS mDh, rS[31:16] IS MULTIPLIED BY rT[31:16] THEN SIGN-EXTENDED AND SUBTRACTED FROM mDh[39:00]. IF THE DESTINATION REGISTER IS mDℓ, rS[15:00] IS MULTIPLIED BY rT[15:00] THEN SIGN-EXTENDED AND SUBTRACTED FROM mDℓ[39:00]. IF THE DESTINATION IS mD, BOTH OPERATIONS ARE PERFORMED AND BOTH RESULTS ARE STORED IN THE ACCUMULATOR REGISTER PAIR mD. IF MSUBA2.S THE RESULT OF EACH SUBTRACTION IS SATURATED BEFORE STORAGE IN THE ACCUMULATOR REGISTER. |
| ADD ACCUMULATORS | *ADDMA[.S]    mD{h,ℓ}, mT{h,ℓ}*<br>THE CONTENTS OF ACCUMULATOR mTh OR mTℓ IS ADDED TO THE CONTENTS OF ACCUMULATOR mSh OR mSℓ, TREATING BOTH REGISTERS AS SIGNED 40-BIT VALUES. mDh OR mDℓ IS UPDATED WITH THE RESULT. IF ADDMA.S, THE RESULT IS SATURATED BEFORE STORAGE. THE SATURATION POINT IS SELECTED AS EITHER 40 OR 32 BITS BY MMD[MS]. |
| SUBTRACT ACCUMULATORS | *SUBMA[.S]    mD{h,ℓ}, mS{h,ℓ}, mT{h,ℓ}*<br>THE CONTENTS OF ACCUMULATOR mTh OR mTℓ IS SUBTRACTED FROM THE CONTENTS OF ACCUMULATOR mSh OR mSℓ, TREATING BOTH REGISTERS AS SIGNED 40-BIT VALUES. mDh OR mDℓ IS UPDATED WITH THE RESULT. IF SUBMA.S, THE RESULT IS SATURATED BEFORE STORAGE. THE SATURATION POINT IS SELECTED AS EITHER 40 OR 32 BITS BY MMD[MS]. |
| DUAL ROUND | *RNDA2    {mT, mTh, mTℓ} [,n]*<br>THE ACCUMULATOR REGISTER mTh OR mTℓ IS ROUNDED, THEN UPDATED. IF mT, THE ACCUMULATOR REGISTER PAIR mTh/mTℓ ARE EACH ROUNDED, THEN UPDATED. THE ROUNDING MODE IS SELECTED IN MMD FIELD "RND". THE LEAST SIGNIFICANT BIT OF PRECISION IN THE ACCUMULATOR REGISTER AFTER ROUNDING IS: 16+n. BITS [15+n:00] ARE ZEROED. THE RANGE n=0-8 IS PERMITTED FOR THE OUTPUT ALIGNMENT SHIFT AMOUNT. IN THE CASE OF n=0, THE FIELD MAY BE OMITTED. |

NOMENCLATURE:

rS, rT = r0-r31 mD  = mDh ‖ mDℓ; ALSO FOR mT
mDh = m0h-m3h; ALSO FOR mSh, mTh
mDℓ = m0ℓ-m3ℓ; ALSO FOR mSh, mTh
HI  = m0h[31:00]
LO  = m0ℓ[31:00]

ASSIGNMENT OF INSTRUCTIONS OF PIPE A, PIPE B

| | Pipe A | Pipe B |
|---|---|---|
| | THE LOAD/STORE PIPE | THE MAC PIPE |
| MIPS 32-BIT GENERAL INSTRUCTIONS | MIPS 32-BIT GENERAL INSTRUCTIONS EXCEPT: CE1 CUSTOM ENGINE OPCODES, MULT(U), DIV(U), MFHI, MFLO, MTHI, MTLO, MAD(U), MSUB(U) | MULT(U), DIV(U), MFHI, MFLO, MTHI, MTLO, MAD(U), MSUB(U) CE1 CUSTOM ENGINE OPCODES, MIPS 32-BIT ALU INSTRUCTIONS NOTE: NO LOAD OR STORE INSTRUCTIONS |
| MIPS 32-BIT CONTROL INSTRUCTIONS | J, JAL, JR, JALR, JALX SYSCALL, BREAK, ALL BRANCH INSTRUCTIONS, ALL COPz, SWCz, LWCz | |
| MIPS16 INSTRUCTIONS (NO DOUBLEWORD INSTRUCTIONS) | ALL MIPS16 INSTRUCTIONS EXCEPT: MULT(U), DIV(U), MFHI, MFLO | MULT(U), DIV(U), MFHI, MFLO |
| EJTAG INSTRUCTIONS | DERET, SDBBP (INCLUDING MIPS16 SDBBP) | |
| LEXRA CONTROL INSTRUCTIONS | MTRU, MFRU, MTRK, MFRK, MTLXC0, MFLXC0 | |
| LEXRA VECTOR ADDRESSING | LT, ST, LTP, LWP, LHP(U), LBP(U), STP, SWP, SHP, SBP | |
| LEXRA MAC INSTRUCTIONS | | MTA2, MFA, MFA2, MULTA, MULTA2, MULNA2, CMULTA, MADDA, MSUBA, ADDMA, SUBMA, DIVA, RNDA2 |
| LEXRA EXTENSIONS TO MIPS ALU INSTRUCTIONS | SLLV2, SRLV2, SRAV2 ADDR, ADDR2, SUBR, SUBR2, SLTR2 | SLLV2, SRLV2, SRAV2 ADDR, ADDR2, SUBR, SUBR2, SLTR2 |
| NEW LEXRA ALU OPERATIONS | MIN, MIN2, MAX, MAX2, ABSR, ABS2, CLS, MUX2, BITREV, CMVEQZ, CMVNEZ | MIN, MIN2, MAX, MAX2, ABSR, ABS2, CLS, MUX2, BITREV, CMVEQZ, CMVNEZ |

FIG.9

VECTOR ADDRESSING INSTRUCTION SUMMARY

1100

| INSTRUCTION | SYNTAX AND DESCRIPTION |
|---|---|
| LOAD TWINWORD | LT    rT, DISPLACEMENT(BASE)<br>THE DISPLACEMENT, IN BYTES, IS A SIGNED 14-BIT QUANTITY THAT MUST BE DIVISIBLE BY 8 (SINCE IT OCCUPIES ONLY 11 BITS OF THE INSTRUCTION WORD). SIGN-EXTEND THE DISPLACEMENT TO 32-BITS AND ADD TO THE CONTENTS OF REGISTER BASE TO FORM THE ADDRESS TEMP. LOAD CONTENTS OF WORD ADDRESSED BY TEMP INTO REGISTER rT (WHICH MUST BE AN EVEN REGISTER). LOAD CONTENTS OF WORD ADDRESSED BY TEMP+4 INTO REGISTER rT+1. |
| STORE TWINWORD | ST    rT, DISPLACEMENT(BASE)<br>THE DISPLACEMENT, IN BYTES, IS A SIGNED 14-BIT QUANTITY THAT MUST BE DIVISIBLE BY 8 (SINCE IT OCCUPIES ONLY 11 BITS OF THE INSTRUCTION WORD). SIGN-EXTEND THE DISPLACEMENT TO 32-BITS AND ADD TO THE CONTENTS OF REGISTER BASE TO FORM THE ADDRESS TEMP. STORE CONTENTS OF REGISTER rT (WHICH MUST BE AN EVEN REGISTER) INTO WORD ADDRESSED BY TEMP. STORE CONTENTS OF REGISTER rT+1 INTO WORD ADDRESSED BY TEMP+4. |
| LOAD TWINWORD, POINTER INCREMENT, OPTIONAL CIRCULAR BUFFER | LTP[.Cn]    rT, (POINTER)STRIDE<br>LET TEMP=CONTENTS OF REGISTER POINTER. LOAD CONTENTS OF WORD ADDRESSED BY TEMP INTO REGISTER rT (WHICH MUST BE AN EVEN REGISTER). LOAD CONTENTS OF WORD ADDRESSED BY TEMP+4 INTO REGISTER rT+1. THE STRIDE, IN BYTES, IS A SIGNED 11-BIT QUANTITY THAT MUST BE DIVISIBLE BY 8 (SINCE IT OCCUPIES ONLY 8 BITS OF THE INSTRUCTION WORD). SIGN-EXTEND THE STRIDE TO 32-BITS AND ADD TO CONTENTS OF REGISTER POINTER TO FORM NEXT ADDRESS. UPDATE POINTER WITH THE CALCULATED NEXT ADDRESS. ".Cn" SELECTS CIRCULAR BUFFER n=0-2. SEE NOTE 2. |
| LOAD WORD, POINTER INCREMENT, OPTIONAL CIRCULAR BUFFER | LWP[.Cn]    rT, (POINTER)STRIDE<br>LOAD CONTENTS OF WORD ADDRESSED BY REGISTER POINTER INTO REGISTER rT. THE STRIDE, IN BYTES, IS A SIGNED 10-BIT QUANTITY THAT MUST BE DIVISIBLE BY 4 (SINCE IT OCCUPIES ONLY 8 BITS OF THE INSTRUCTION WORD). SIGN-EXTEND THE STRIDE TO 32-BITS AND ADD TO CONTENTS OF REGISTER POINTER TO FORM NEXT ADDRESS. UPDATE POINTER WITH THE CALCULATED NEXT ADDRESS. ".Cn" SELECTS CIRCULAR BUFFER n=0-2. SEE NOTE 2. |
| LOAD HALFWORD, POINTER INCREMENT, OPTIONAL CIRCULAR BUFFER | LHP[.Cn]    rT, (POINTER)STRIDE<br>LOAD CONTENTS OF SIGN-EXTENDED HALFWORD ADDRESSED BY REGISTER POINTER INTO REGISTER rT. THE STRIDE, IN BYTES, IS A SIGNED 9-BIT QUANTITY THAT MUST BE DIVISIBLE BY 2 (SINCE IT OCCUPIES ONLY 8 BITS OF THE INSTRUCTION WORD). SIGN-EXTEND THE STRIDE TO 32-BITS AND ADD TO CONTENTS OF REGISTER POINTER TO FORM NEXT ADDRESS. UPDATE POINTER WITH THE CALCULATED NEXT ADDRESS. ".Cn" SELECTS CIRCULAR BUFFER n=0-2. SEE NOTE 2. |
| LOAD HALFWORD UNSIGNED, POINTER INCREMENT, OPTIONAL CIRCULAR BUFFER | LHPU[.Cn]    rT, (POINTER)STRIDE<br>LOAD CONTENTS OF ZERO-EXTENDED HALFWORD ADDRESSED BY REGISTER POINTER INTO REGISTER rT. THE STRIDE, IN BYTES, IS A SIGNED 9-BIT QUANTITY THAT MUST BE DIVISIBLE BY 2 (SINCE IT OCCUPIES ONLY 8 BITS OF THE INSTRUCTION WORD). SIGN-EXTEND THE STRIDE TO 32-BITS AND ADD TO CONTENTS OF REGISTER POINTER TO FORM NEXT ADDRESS. UPDATE POINTER WITH THE CALCULATED NEXT ADDRESS. ".Cn" SELECTS CIRCULAR BUFFER n=0-2. SEE NOTE 2. |

FIG.11A

VECTOR ADDRESSING INSTRUCTION SUMMARY

| INSTRUCTION | SYNTAX AND DESCRIPTION |
|---|---|
| LOAD BYTE, POINTER INCREMENT, OPTIONAL CIRCULAR BUFFER | *LBP[.Cn]*      *rT, (POINTER)STRIDE*<br>LOAD CONTENTS OF SIGN-EXTENDED BYTE ADDRESSED BY REGISTER *POINTER* INTO REGISTER rT. THE STRIDE, IN BYTES, IS A SIGNED 8-BIT QUANTITY. SIGN-EXTEND THE STRIDE TO 32-BITS AND ADD TO CONTENTS OF REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| LOAD BYTE UNSIGNED, POINTER INCREMENT, OPTIONAL CIRCULAR BUFFER | *LBPU[.Cn]*      *rT, (POINTER)STRIDE*<br>LOAD CONTENTS OF ZERO-EXTENDED BYTE ADDRESSED BY REGISTER *POINTER* INTO REGISTER rT. THE STRIDE, IN BYTES, IS A SIGNED 8-BIT QUANTITY. SIGN-EXTEND THE STRIDE TO 32-BITS AND ADD TO CONTENTS TO REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| STORE TWINWORD, POINTER INCREMENT, OPTIONAL CIRCULAR BUFFER | *STP[.Cn]*      *rT, (POINTER)STRIDE*<br>LET *TEMP*=CONTENTS OF REGISTER *POINTER*. STORE CONTENTS OF REGISTER rT (WHICH MUST BE AN EVEN REGISTER) INTO WORD ADDRESSED BY *TEMP*. STORE CONTENTS OF REGISTER rT+1 INTO WORD ADDRESSED BY *TEMP*+4. THE STRIDE, IN BYTES, IS A SIGNED 11-BIT QUANTITY THAT MUST BE DIVISIBLE BY 8 (SINCE IT OCCUPIES ONLY 8 BITS OF THE INSTRUCTION WORD). SIGN-EXTEND THE STRIDE TO 32-BITS AND ADD TO CONTENTS OF REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| STORE WORD, POINTER INCREMENT, OPTIONAL CIRCULAR BUFFER | *SWP[.Cn]*      *rT, (POINTER)STRIDE*<br>STORE CONTENTS OF REGISTER rT INTO WORD ADDRESSED BY REGISTER *POINTER*. THE STRIDE, IN BYTES, IS A SIGNED 10-BIT QUANTITY THAT MUST BE DIVISIBLE BY 4 (SINCE IT OCCUPIES ONLY 8 BITS OF THE INSTRUCTION WORD). SIGN-EXTEND THE STRIDE TO 32-BITS AND ADD TO CONTENTS OF REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| STORE HALFWORD, POINTER INCREMENT OPTIONAL CIRCULAR BUFFER | *SHP[.Cn]*      *rT, (POINTER)STRIDE*<br>STORE CONTENTS OF REGISTER rT[15:00] INTO 16-BIT HALFWORD ADDRESSED BY REGISTER *POINTER*. THE STRIDE, IN BYTES, IS A SIGNED 9-BIT QUANTITY THAT MUST BE DIVISIBLE BY 2 (SINCE IT OCCUPIES ONLY 8 BITS OF THE INSTRUCTION WORD). SIGN-EXTEND THE STRIDE TO 32-BITS AND ADD TO CONTENTS OF REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| STORE BYTE, POINTER INCREMENT, OPTIONAL CIRCULAR BUFFER | *SBP[.Cn]*      *rT, (POINTER)STRIDE*<br>STORE CONTENTS OF REGISTER rT[07:00] INTO BYTE ADDRESSED BY REGISTER *POINTER*. THE STRIDE, IN BYTES, IS A SIGNED 8-BIT QUANTITY. SIGN-EXTEND THE STRIDE TO 32-BITS AND ADD TO CONTENTS OF REGISTER *POINTER* TO FORM NEXT ADDRESS. UPDATE *POINTER* WITH THE CALCULATED NEXT ADDRESS. ".Cn" SELECTS CIRCULAR BUFFER n=0-2. SEE NOTE 2. |
| MOVE TO RADIAX, USER | *MTRU*      *rT, RADREG*<br>MOVE THE CONTENTS OF REGISTER rT TO ONE OF THE USER RADIAX REGISTERS: cbs0-cbs2, cbe0-cbe2, mmd, lpc0, lpe0, lps0. THIS INSTRUCTION HAS A SINGLE DELAY SLOT BEFORE THE UPDATED REGISTER TAKES EFFECT. |

FIG.11B

| INSTRUCTION | SYNTAX AND DESCRIPTION |
|---|---|
| MOVE FROM RADIAX, USER | *MFRU*  rT, *RADREG*<br>MOVE THE CONTENTS OF THE DESIGNATED USER RADIAX REGISTER (cbs0-cbs2, cbe0-cbe2, mmd, lpc0, lps0, lpe0) TO REGISTER rT. |

NOMENCLATURE:

rT = r0-r31, AND MUST BE EVEN FOR LT, ST, LTP[.Cn], STP[.Cn]
    BASE, POINTER = r0-r31
    STRIDE = 8/9/10/11-BIT SIGNED VALUE (IN BYTES) FOR BYTE/HALFWORD/WORD/TWINWORD OPS.
    DISPLACEMENT = 14-BIT SIGNED VALUE, IN BYTES
    RADREG = cbs0-cbs2, cbe0-cbe2, mmd, lpc0, lps0, lpe0

NOTES:
1. FOR LTP[.Cn], LWP[.Cn], LHP(U)[.Cn], LBP(U)[.Cn], rT=*POINTER* IS UNSUPPORTED.
2. WHEN A CIRCULAR BUFFER IS SELECTED, THE UPDATE OF THE POINTER REGISTER IS PERFORMED ACCORDING TO THE FOLLOWING ALGORITHM, WHICH DEPENDS ON THE SIGN OF THE STRIDE AND THE GRANULARITY OF THE ACCESS. A STRIDE EXACTLY EQUAL TO 0 IS NOT SUPPORTED:

FOR LBP(U).Cn ADN SBP.Cn:

IF (STRIDE>0 && POINTER[2:0] == 111 && POINTER[31:3] == CBEn)
        THEN POINTER<= CBSn[31:3] || 000
ELSE IF (STRIDE<0 && POINTER[2:0] == 000 && POINTER[31:3] == CBSn)
        THEN POINTER<= CBEn[31:3] || 111
ELSE     POINTER<= POINTER + STRIDE.

FOR LHP(U).Cn AND SHP.Cn
    IF (STRIDE>0 && POINTER[2:0] == 11x && POINTER[31:3] == CBEn)
        THEN POINTER<= CBSn[31:3] || 000
ELSE IF (STRIDE<0 && POINTER[2:0] == 00x && POINTER[31:3] == CBSn)
        THEN POINTER<= CBEn[31:3] || 110
ELSE     POINTER<= POINTER + STRIDE.

FOR LWP.Cn AND SWP.Cn
    IF (STRIDE>0 && POINTER[2:0] == 1xx && POINTER[31:3] == CBEn)
        THEN POINTER<= CBSn[31:3] || 000
ELSE IF (STRIDE<0 && POINTER[2:0] == 0xx && POINTER[31:3] == CBSn)
        THEN POINTER<= CBEn[31:3] || 100
ELSE     POINTER<= POINTER + STRIDE.

FOR LTP.Cn AND STP.Cn
    IF (STRIDE>0     && POINTER[31:3] == CBEn)
        THEN POINTER<= CBSn[31:3] || 000
ELSE IF (STRIDE<0     && POINTER[31:3] == CBSn)
        THEN POINTER<= CBEn[31:3] || 000
ELSE     POINTER<= POINTER + STRIDE.

EXTENSIONS TO MIPS ALU OPERATIONS

| INSTRUCTION | SYNTAX AND DESCRIPTION |
|---|---|
| DUAL SHIFT LEFT LOGICAL VARIABLE | *SLLV2*  rD, rT, rS<br>THE CONTENTS OF rT[31:16] AND THE CONTENTS OF rT[15:00] ARE INDEPENDENTLY SHIFTED LEFT BY THE NUMBER OF BITS SPECIFIED BY THE LOW ORDER FOUR BITS OF THE CONTENTS OF GENERAL REGISTER rS, INSERTING ZEROS INTO THE LOW ORDER BITS OF rT[31:16] AND rT[15:00]. FOR SLLV2, THE HIGH AND LOW RESULTS ARE CONCATENATED AND PLACED IN REGISTER rD. (NOTE THAT A [.S] OPTION IS NOT PROVIDED BECAUSE THIS IS A *LOGICAL* RATHER THAN *ARITHMETIC* SHIFT AND THUS THE CONCEPT OF ARITHMETIC OVERFLOW IS NOT RELEVANT.) |
| DUAL SHIFT RIGHT LOGICAL VARIABLE | *SRLV2*  rD, rT, rS<br>THE CONTENTS OF rT[31:16] AND THE CONTENTS OF rT[15:00] ARE INDEPENDENTLY SHIFTED RIGHT BY THE NUMBER OF BITS SPECIFIED BY THE LOW ORDER FOUR BITS OF THE CONTENTS OF GENERAL REGISTER rS, INSERTING ZEROS INTO THE HIGH ORDER BITS OF rT[31:16] AND rT[15:00]. THE HIGH AND LOW RESULTS ARE CONCATENATED AND PLACED IN REGISTER rD. (NOTE THAT A [.S] OPTION IS NOT PROVIDED BECAUSE THIS IS A *LOGICAL* RATHER THAN *ARITHMETIC* SHIFT AND THUS THE CONCEPT OF ARITHMETIC OVERFLOW IS NOT RELEVANT.) |
| DUAL SHIFT RIGHT ARITHMETIC VARIABLE | *SRAV2*  rD, rT, rS<br>THE CONTENTS OF rT[31:16] AND THE CONTENTS OF rT[15:00] ARE INDEPENDENTLY SHIFTED RIGHT BY THE NUMBER OF BITS SPECIFIED BY THE LOW ORDER FOUR BITS OF THE CONTENTS OF GENERAL REGISTER rS, SIGN-EXTENDING THE HIGH ORDER BITS OF rT[31:16] AND rT[15:00]. THE HIGHT AND LOW RESULTS ARE CONCATENATED AND PLACED IN REGISTER rD. (NOTE THAT A [.S] OPTION IS NOT PROVIDED BECAUSE ARITHMETIC OVERFLOW/UNDERFLOW IS NOT POSSIBLE. |
| ADD, OPTIONAL SATURATION | *ADDR[.S]*  rD, rS, rT<br>32-BIT ADDITION. CONSIDERING BOTH QUANTITIES AS SIGNED 32-BIT INTEGERS, ADD THE CONTENTS OF REGISTER rS TO rT. FOR ADDR, THE RESULT IS PLACED IN REGISTER rD, IGNORING ANY OVERFLOW OR UNDERFLOW. FOR ADDR.S, THE RESULT IS SATURATED TO 0 $\parallel$ $1^{31}$ (IF OVERFLOW) OR 1 $\parallel$ $0^{31}$ (IF UNDERFLOW) THEN PLACED IN rD.ADDR[.S] WILL NOT CAUSE AN OVERFLOW TRAP. |
| DUAL ADD, OPTIONAL SATURATION | *ADDR2[.S]*  rD, rS, rT<br>DUAL 16-BIT ADDITION. CONSIDERING ALL QUANTITIES AS SIGNED 16-BIT INTEGERS, ADD THE CONTENTS OF REGISTER rS[15:00] TO rT[15:00] AND, INDEPENDENTLY ADD THE CONTENTS OF REGISTER rS[31:16] TO rT[31:16]. FOR ADDR2, THE HIGH AND LOW RESULTS ARE CONCATENATED AND PLACED IN REGISTER rD IGNORING ANY OVERFLOW OR UNDERFLOW. FOR ADDR2.S, THE TWO RESULTS ARE INDEPENDENTLY SATURATED TO 0 $\parallel$ $1^{15}$ (IF OVERFLOW) OR 1 $\parallel$ $0^{15}$ (IF UNDERFLOW) THEN PLACED IN rD.ADDR2[.S] WILL NOT CAUSE AN OVERFLOW TRAP. |

FIG.12A

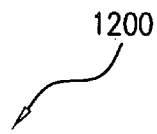

| INSTRUCTION | SYNTAX AND DESCRIPTION |
|---|---|
| SUBTRACT, OPTIONAL SATURATION | *SUBR[.S]*      rD, rS, rT<br>32-BIT SUBTRACTION. CONSIDERING BOTH QUANTITIES AS SIGNED 32-BIT INTEGERS, SUBTRACT THE CONTENTS OF REGISTER rT FROM THE CONTENTS OF REGISTER rS. FOR SUBR, THE RESULT IS PLACED IN REGISTER rD IGNORING ANY OVERFLOW OR UNDERFLOW. FOR SUBR.S, THE RESULT IS SATURATED TO $0 \parallel 1^{31}$ (IF OVERFLOW) OR $1 \parallel 0^{31}$ (IF UNDERFLOW) THEN PLACED IN rD SUBR[.S] WILL NOT CAUSE AN OVERFLOW TRAP. |
| DUAL SUBRACT, OPTIONAL SATURATION | *SUBR2[.S]*      rD, rS, rT<br>DUAL 16-BIT SUBTRACTION. CONSIDERING ALL QUANTITIES AS SIGNED 16-BIT INTEGERS, SUBTRACT THE CONTENTS OF REGISTER rT[15:00] FROM rS[15:00] AND , INDEPENDENTLY SUBTRACT THE CONTENTS OF REGISTER rT[31:16] FROM rS[31:16]. FOR SUBR2, THE HIGH AND LOW RESULTS ARE CONCATENATED AND PLACED IN REGISTER rD IGNORING ANY OVERFLOW OR UNDERFLOW. FOR SUBR2.S, THE TWO RESULTS ARE INDEPENDENTLY SATURATED TO $0 \parallel 1^{15}$ (IF OVERFLOW) OR $1 \parallel 0^{15}$ (IF UNDERFLOW) THEN PLACED IN rD. SUBR2[.S] WILL NOT CAUSE AN OVERFLOW TRAP. |
| DUAL SET ON LESS THAN | *SLTR2*      rD, rS, rT<br>DUAL 16-BIT COMPARISON. CONSIDERING BOTH QUANTITIES AS SIGNED 16-BIT INTEGERS, IF rS[15:00] IS LESS THAN rT[15:00] TO $0^{15} \parallel 1$, ELSE TO ZERO.<br>INDEPENDENTLY, CONSIDERING BOTH QUANTITIES AS SIGNED 16-BIT INTEGERS, IF rS[31:16] IS LESS THAN rT[31:16] THEN SET rD[31:16] TO $0^{15} \parallel 1$, ELSE TO ZERO. |

NOMENCLATURE:

ALU OPERATIONS

| INSTRUCTION | SYNTAX AND DESCRIPTION |
|---|---|
| MINIMUM | *MIN  rD, rS, rT*<br>THE CONTENTS OF THE GENERAL REGISTER rT ARE COMPARED WITH rS CONSIDERING BOTH QUANTITIES AS SIGNED 32-BIT INTEGERS. IF rS<rT OR rS=rT,rS IS PLACED INTO rD. IF, rS>rT,rT IS PLACED INTO rD. |
| DUAL MINIMUM | *MIN2  rD, rS, rT*<br>THE CONTENTS OF rT[31:16] ARE COMPARED WITH rS[31:16] CONSIDERING BOTH QUANTITIES AS SIGNED 16-BIT INTEGERS. IF rS[31:16]<rT[31:16] OR rS[31:16]=rT[31:16], rS[31:16] IS PLACED INTO rD[31:16]. IF, rS[31:16]>rT[31:16], rT[31:16] IS PLACED INTO rD[31:16]. A SIMILAR, INDEPENDENT OPERATION IS PERFORMED ON rT[15:00] AND rS[15:00] TO DETERMINE rD[15:00]. |
| MAXIMUM | *MAX  rD, rS, rT*<br>THE CONTENTS OF THE GENERAL REGISTER rT ARE COMPARED WITH rS CONSIDERING BOTH QUANTITIES AS SIGNED 32-BIT INTEGERS. IF rS>rT OR rS=rT, rS IS PLACED INTO rD. IF, rS<rT, rT IS PLACED INTO rD. |
| DUAL MAXIMUM | *MAX2  rD, rS, rT*<br>THE CONTENTS OF rT[31:16] ARE COMPARED WITH rS[31:16] CONSIDERING BOTH QUANTITIES AS SIGNED 16-BIT INTEGERS. IF rS[31:16]>rT[31:16] OR rS[31:16]=rT[31:16], rS[31:16] IS PLACED INTO rD[31:16]. IF, rS[31:16]<rT[31:16], rT[31:16] IS PLACED INTO rD[31:16]. A SIMILAR, INDEPENDENT OPERATION IS PERFORMED ON rT[15:00] AND rS[15:00] TO DETERMINE rD[15:00]. |
| ABSOLUTE, OPTIONAL SATURATION | *ABSR[.S]  rD, rT*<br>CONSIDERING rT AS A SIGNED 32-BIT INTEGER, IF rT>0, rT IS PLACED INTO rD. IF rT< 0, rT IS PLACED INTO rD. IF ABSR.S AND rT=1 \|\| $0^{31}$ (THE SMALLEST NEGATIVE NUMBER) THEN 0 \|\| $1^{31}$ (THE LARGEST POSITIVE NUMBER) IS PLACED INTO rD; OTHERWISE, IF ABSR AND rT=1 \|\| $0^{31}$, rT IS PLACED INTO rD. |
| DUAL ABSOLUTE, OPTIONAL SATURATION | *ABSR2[.S]  rD, rT*<br>ABS[.S] OPERATIONS ARE PERFORMED INDEPENDENTLY ON rT[31:16] AND rT[15:00], CONSIDERING EACH TO BE 16-BIT SIGNED INTEGERS. rD IS UPDATED WITH THE ABSOLUTE VALUE OF rT[31:16] CONCATENATED WITH THE ABSOLUTE VALUE OF rT[15:00]. |
| DUAL MUX | *MUX2{[.HH],[.HL],[.LH],[.LL]}  rD, rS, rT*<br>rD[31:16] IS UPDATED WITH rS[31:16] FOR MUX2.HH OR MUX2.HL<br>rD[31:16] IS UPDATED WITH rS[15:00] FOR MUX2.LH OR MUX2.LL<br>rD[15:00] IS UPDATED WITH rT[31:16] FOR MUX2.HH OR MUX2.LH<br>rD[15:00] IS UPDATED WITH rT[15:00] FOR MUX2.HL OR MUX2.LL |
| COUNT LEADING SIGN BITS | *CLS  rD, rT*<br>THE BINARY-ENCODED NUMBER OF REDUNDANT SIGN BITS OF GENERAL REGISTER rT IS PLACED INTO rD. IF rT[31:30]=10 OR 01, rD IS UPDATED WITH 0. IF rT=0, OR IF rT =$1^{32}$, rD IS UPDATED WITH $0^{27}$ \|\| $1^5$ (DECIMAL 31). |

ALU OPERATIONS

| INSTRUCTION | SYNTAX AND DESCRIPTION |
|---|---|
| BIT REVERSE | *BITREV*  rD, rT, rS<br>A BIT-REVERSAL OF THE CONTENTS OF GENERAL REGISTER rT IS PERFORMED. THE RESULT IS THEN SHIFTED RIGHT LOGICALLY BY THE AMOUNT SPECIFIED IN THE LOWER 5-BITS OF THE CONTENTS OF GENERAL REGISTER rS, THEN STORED IN rD. |

NOMENCLATURE:
    rD = r0-r31
    rS = r0-r31
    rT = r0-r31

FIG.13B

CONDITIONAL OPERATIONS

| INSTRUCTION | SYNTAX AND DESCRIPTION |
|---|---|
| CONDITIONAL MOVE ON EQUAL ZERO | *CMVEQZ[.H] [.L] rD, rS, rT*  FULL 32-BIT<br>IF THE GENERAL REGISTER rT IS EQUAL TO 0, THE GENERAL REGISTER rD IS UPDATED WITH rS; OTHERWISE rD IS UNCHANGED. FOR[.H] IF rT[31:16] IS EQUAL TO 0, THE *FULL 32-BIT* GENERAL REGISTER rD[31:00] IS UPDATED WITH rS; OTHERWISE rD IS UNCHANGED. FOR [.L] IF rT[15:00] IS EQUAL TO 0, THE *FULL 32-BIT* GENERAL REGISTER rD[31:00] IS UPDATED WITH rS; OTHERWISE rD IS UNCHANGED. |
| CONDITIONAL MOVE ON NOT EQUAL ZERO | *CMVNEZ[.H] [.L] rD, rS, rT*<br>IF THE GENERAL REGISTER rT IS NOT EQUAL TO 0, THE GENERAL REGISTER rD IS UPDATED WITH rS; OTHERWISE rD IS UNCHANGED. FOR [.H] IF rT[31:16] IS NOT EQUAL TO 0, THE *FULL 32-BIT* GENERAL REGISTER rD[31:00] IS UPDATED WITH rS; OTHERWISE rD IS UNCHANGED. FOR [.L] IF rT[15:00] IS NOT EQUAL TO 0, THE *FULL 32-BIT* GENERAL REGISTER rD[31:00] IS UPDATED WITH rS; OTHERWISE rD IS UNCHANGED. |

NOMENCLATURE:
    rD = r0-r31
    rS = r0-r31
    rT = r0-r31

USAGE NOTE:
WHEN COMBINED WITH THE SLT OR SLTR2 INSTRUCTIONS, THE CONDITIONAL MOVE INSTRUCTIONS CAN BE USED TO CONSTRUCT A COMPLETE SET OF CONDITIONAL MOVE MACRO-OPERATIONS. FOR EXAMPLE:

```
if(r3<r4) r1<--r2

CMVLT  r1,r2,r3,r4  ===>  SLT      AT,r3,r4
                             CMVNEZ   r1,r2,AT
if(r3>=r4) r1<--r2

CMVGE  r1,r2,r3,r4  ===>  SLT      AT,r3,r4
                             CMVEQZ   r1,r2,AT
if(r3<=r4) r1<-r2

CMVLE  r1,r2,r3,r4  ===>  SLT      AT,r4,r3
                             CMVEQZ   r1,r2,AT
f(r3>r4) r1<--r2

CMVGT  r1,r2,r3,r4  ===>  SLT      AT,r4,r3
                             CMVNEZ   r1,r2,AT
```

FIG.14

CYCLES REQUIRED BETWEEN DUAL MAC INSTRUCTIONS

| 1st OP<br>2nd OP | MULTA(U) | MADDA(U),<br>MSUBA(U) | CMULTA | DIVA(U) | MADDA2[.S],<br>MSUBA2[.S],<br>ADDMA[.S],<br>SUBMA[.S],<br>MULTA2,<br>MULNA2,<br>RNDA2,<br>MTA2 | MFA |
|---|---|---|---|---|---|---|
| MULTA(U),<br>MADDA(U),MSUBA(U) | 1U | 1U | 1U | (19T) | — | — |
| DIVA(U) | (3T) | (4T) | (1T) | 19U | — | — |
| CMULTA,<br>MADDA2[.S],<br>MSUBA2[.S],<br>MULTA2,MULNA2,<br>MTA2 | 3U | 4U | 1U | (19T) | — | — |
| ADDMA[.S],<br>SUBMA[.S],<br>RNDA2 | LO HI<br>2S 3S<br>2T 3T | 4U | 1S<br>1T | (19S)<br>(19T) | | |
| MFA | LO HI<br>4S 5S | LO HI<br>5S 6S | 3S | 19S | 2S | — |

NOTES:  — MEANS THE TWO OPS CAN BE ISSUED BACK-TO-BACK.
xU INDICATES UNCONDITIONAL DELAY OF THE INDICATED NUMBER OF CYCLES.
xS INDICATES DELAY ONLY IF (ANY) 2nd OP SOURCE IS THE SAME AS (ANY) 1st OP TARGET (PRODUCER-CONSUMER DEPENDENCY).
xT INDICATES DELAY ONLY IF (ANY) 2nd OP TARGET IS THE SAME AS (ANY) 1st OP TARGET (PRESERVE WRITE AFTER WRITE ORDER).
ITEMS IN PARENTHESIS ARE UNLIKELY TO OCCUR IN ANY USEFUL PROGRAM, WHICH WOULD PROBABLY HAVE AN INTERVENING MFA.
LO/HI INDICATE THAT FOR THE 72-BIT RESULT OF A 32x32 MULT OR MADDA, THE LO 32-BITS (m0!, m1!, ETC.) ARE AVAILABLE ONE CYCLE EARLIER.
DELAY OF "x" CYCLES MEANS THAT IF THE 1st OP ISSUES IN CYCLE N, THEN THE 2nd OP MAY ISSUE IN CYCLE N+x+1.

FIG. 15

I. LOAD/STORE FORMATS

| 31 | 26 25 | 21 20 | 17 16 | 6 5 | 0 |
|---|---|---|---|---|---|
| LEXOP 011_111 | BASE | rt-EVEN | IMMEDIATE | | SUBOP |
| 6 | 5 | 4 | 11 | | 6 |

| ASSEMBLER MNEMONIC | BASE | rt-EVEN | IMMEDIATE | LEXRA SUBOP |
|---|---|---|---|---|
| LT | BASE | rt-EVEN | DISPLACEMENT/8 | LT |
| ST | BASE | rt-EVEN | DISPLACEMENT/8 | ST |

| 31 | 26 25 | 21 20 | 16 15 | 8 7 6 5 | 0 |
|---|---|---|---|---|---|
| LEXOP 011_111 | POINTER | rt | IMMEDIATE | CC | SUBOP |
| 6 | 5 | 5 | 8 | 2 | 6 |

| ASSEMBLER MNEMONIC | POINTER | rt | IMMEDIATE | cc | LEXRA SUBOP |
|---|---|---|---|---|---|
| LBP[.Cn] | POINTER | rt | STRIDE | cc | LBP |
| LBPU[.Cn] | POINTER | rt | STRIDE | cc | LBPU |
| LHP[.Cn] | POINTER | rt | STRIDE/2 | cc | LHP |
| LHPU[.Cn] | POINTER | rt | STRIDE/2 | cc | LHPU |
| LWP[.Cn] | POINTER | rt | STRIDE/4 | cc | LWP |
| LTP[.Cn] | POINTER | rt | STRIDE/8 | cc | LTP |
| SBP[.Cn] | POINTER | rt | STRIDE | cc | SBP |
| SHP[.Cn] | POINTER | rt | STRIDE/2 | cc | SHP |
| SWP[.Cn] | POINTER | rt | STRIDE/4 | cc | SWP |
| STP[.Cn] | POINTER | rt | STRIDE/8 | cc | STP |

BASE,POINTER,rt  SELECTS GENERAL REGISTER r0-r31.
rt-EVEN  SELECTS GENERAL REGISTER EVEN-ODD PAIR r0/r1,r2/r3,...r30/r31
STRIDE  SIGNED 2s-COMPLEMENT NUMBER IN BYTES. MUST BE AN INTEGRAL NUMBER OF HALFWORDS/WORDS/TWINWORDS FOR THE CORRESPONDING INSTRUCTIONS.

DISPLACEMENT  SIGNED 2s-COMPLEMENT NUMBER IN BYTES. MUST BE AN INTEGRAL NUMBER OF TWINWORDS.

cc
00  SELECT CIRCULAR BUFFER 0(cbs0,cbe0)
01  SELECT CIRCULAR BUFFER 1(cbs1,cbe1)
10  SELECT CIRCULAR BUFFER 2(cbs2,cbe2)
11  NO CIRCULAR BUFFER SELECTED

FIG.17A

II. ARITHMETIC FORMAT

| 31 — 26 | 25 — 21 | 20 — 16 | 15 — 11 | 10 9 8 | 7 | 6 | 5 — 0 |
|---|---|---|---|---|---|---|---|
| LEXOP 011_111 | rs | rt | rd | h1 | 0 | s d | SUBOP |
| 6 | 5 | 5 | 5 | 2 | 1 | 1 1 | 6 |

| ASSEMBLER MNEMONIC | rs | rt | rd | h1 | s | d | LEXRA SUBOP |
|---|---|---|---|---|---|---|---|
| ADDR[.S],ADDR2[.S] | rs | rt | rd | 0 | s | d | ADDR |
| SUBR.S,SUBR2[.S] | rs | rt | rd | 0 | s | d | SUBR |
| SLTR2 | rs | rt | rd | 0 | 0 | 1 | SLTR |
| SLLV2 | rs | rt | rd | 0 | 0 | 1 | SLLV |
| SRLV2 | rs | rt | rd | 0 | 0 | 1 | SRLV |
| SRAV2 | rs | rt | rd | 0 | 0 | 1 | SRAV |
| MIN,MIN2 | rs | rt | rd | 0 | 0 | d | MIN |
| MAX,MAX2 | rs | rt | rd | 0 | 0 | d | MAX |
| ABSR[.S],ABSR2[.S] | 0 | rt | rd | 0 | s | d | ABSR |
| MUX2.[LL,LH,HL,HH] | rs | rt | rd | h1 | 0 | 1 | MUX |
| CLS | 0 | rt | rd | 0 | 0 | 0 | CLS |
| BITREV | rs | rt | rd | 0 | 0 | 0 | BITREV | rs,rt,rd

SELECTS GENERAL REGISTER r0–r31.

s

SELECTS SATURATION OF RESULT. s=1 INDICATES THAT SATURATION IS PERFORMED.

d d=1 INDICATES THAT DUAL OPERATIONS ON 16-BIT DATA ARE PERFORMED.

h1 (FOR MUX2)

III. MAC FORMAT A

| 31 | 26 | 25 | 21 | 20 | 16 | 15 | 11 | 10 | 9 | 8 | 7 | 6 | 5 | 0 |
|---|---|---|---|---|---|---|---|---|---|---|---|---|---|---|
| LEXOP 011_111 | | rs | | rt | | md | | 0 | u | gz | s | d | SUBOP | |
| 6 | | 5 | | 5 | | 5 | | 1 | 1 | 1 | 1 | 1 | 6 | |

| ASSEMBLER MNEMONIC | rs | rt | md | u | gz | s | d | LEXRA SUBOP |
|---|---|---|---|---|---|---|---|---|
| CMULTA | rs | rt | md | 0 | 0 | 0 | 0 | CMULTA |
| DIVA(U) | rs | rt | md | u | 0 | 0 | 0 | DIVA |
| MULTA(U) | rs | rt | md | u | 1 | 0 | 0 | MADDA |
| MULTA2 | rs | rt | md | 0 | 1 | 0 | 1 | MADDA |
| MADDA(U) | rs | rt | md | u | 0 | 0 | 0 | MADDA |
| MADDA2[.S] | rs | rt | md | 0 | 0 | s | 1 | MADDA |
| MSUBA(U) | rs | rt | md | u | 0 | 0 | 0 | MSUBA |
| MSUBA2[.S] | rs | rt | md | 0 | 0 | s | 1 | MSUBA |
| MULNA2 | rs | rt | md | 0 | 1 | 0 | 1 | MSUBA |
| MTA2[.G] | rs | 0 | md | 0 | g | 0 | 1 | MTA | rs,rt     SELECTS GENERAL REGISTER r0-r31.

md     SELECTS ACCUMULATOR, 0NNHL WHERE,

NN=m0-m3
     HL
     00=RESERVED          01=mN1
     10=mNh                11=mN s         SELECTS SATURATION OF RESULT. s=1 INDICATES THAT SATURATION IS PERFORMED.

d         d=1 INDICATES THAT DUAL OPERATIONS ON 16-BIT DATA ARE PERFORMED.

gz       FOR MTA2, USED AS "GUARD" BIT. IF g=1, BITS [39:32] OF THE ACCUMULATOR (PAIR) ARE LOADED AND BITS [31:00] ARE UNCHANGED. IF g=0, ALL 40 BITS [39:0] OF THE ACCUMULATOR (OR PAIR) ARE UPDATED.

FOR MADDA,MSUBA,USED A "ZERO" BIT. IF z=1, THE RESULT IS ADDED TO (SUBTRACTED FROM) ZERO RATHER THAN THE PREVIOUS ACCUMULATOR VALUE; THIS PERFORMS A MULTA, MULTA2 OR MULNA2. IF z=0, PERFORMS A MADDA,MSUBA,MADDA2 OR MSUBA2.

u         TREAT OPERANDS AS UNSIGNED VALUES (0=SIGNED,1=UNSIGNED)

FIG.17C

IV. MAC FORMAT B

| 31  26 | 25  21 | 20  16 | 15  11 | 10  7 | 6 | 5  0 |
|---|---|---|---|---|---|---|
| LEXOP 011_111 | 00000 | mt | rd | so | d | SUBOP |
| 6 | 5 | 5 | 5 | 4 | 1 | 6 |

| ASSEMBLER MNEMONIC | mt | rd | so | d | LEXRA SUBOP |
|---|---|---|---|---|---|
| MFA,MFA2 | mt | rd | so | d | MFA |
| RNDA2 | mt | 0 | so | 1 | RNDA |

<u>rd</u>

SELECTS GENERAL REGISTER r0-r31.

<u>mt</u>   SELECTS ACCUMULATOR, 0NNHL WHERE,

NN=m0-m3
  <u>HL</u>
  00=RESERVED
  01=mN1
  10=mNh
  11=mN

<u>d</u> d=1 INDICATES THAT DUAL OPERATIONS ON 16-BIT DATA ARE PERFORMED.

<u>so</u>

ENCODED ("OUTPUT") SHIFT AMOUNT n=0-8 FOR RNDA2,MFA,MFA2 INSTRUCTIONS.

FIG.17D

V. MAC FORMAT C

| 31 26 | 25 21 | 20 16 | 15 11 | 10 8 | 7 6 | 5 0 |
|---|---|---|---|---|---|---|
| LEXOP 011_111 | ms | mt | md | 000 | s 0 | SUBOP |
| 6 | 5 | 5 | 5 | 3 | 1 1 | 6 |

| ASSEMBLER MNEMONIC | ms | mt | md | s | LEXRA SUBOP |
|---|---|---|---|---|---|
| ADDMA[.S] | ms | mt | md | s | ADDMA |
| SUBMA[.S] | ms | mt | md | s | SUBMA | mt,ms,md

SELECTS ACCUMULATOR, 0NNHL WHERE,

NN=m0-m3
    HL
    00=RESERVED
    01=mN1
    10=mNh
    11=mN s

SELECTS SATURATION OF RESULT. s=1 INDICATES THAT SATURATION IS PERFORMED.

FIG.17E

VI. RADIAX MOVE FORMAT AND LEXRA-COP0 MTLXC0/MFLXC0 INSTRUCTIONS

| 31 | 26 | 25 | 21 | 20 | 16 | 15 | 11 | 10 | 8 | 7 | 6 | 5 | 0 |
|---|---|---|---|---|---|---|---|---|---|---|---|---|---|
| LEXOP 011_111 | | 00000 | | rt | | ru/rk | | 000 | | k | 0 | SUBOP | |
| 6 | | 5 | | 5 | | 5 | | 3 | | 1 | 1 | 6 | |

| ASSEMBLER MNEMONIC | rt | ru/rk | k | LEXRA SUBOP |
|---|---|---|---|---|
| MFRU | rt | ru | 0 | MFRAD |
| MTRU | rt | ru | 0 | MTRAD |
| MFRK | rt | rk | 1 | MFRAD |
| MTRK | rt | rk | 1 | MTRAD | rt

SELECTS GENERAL REGISTER r0-r31.

rk

SELECTS RADIAX KERNEL REGISTER IN MFRK,MTRK INSTRUCTIONS-CURRENTLY ALL RESERVED. HOWEVER, A COPROCESSOR UNUSABLE EXCEPTION IS TAKEN IN USER MODE IF THE Cu0 BIT IS 0 IN THE CP0 STATUS REGISTER WHEN MFRK OR MTRK IS EXECUTED.

ru

SELECTS RADIAX USER REGISTER IN MFRU,MTRU INSTRUCTIONS.

```
00000  cbs0
00001  cbs1
00010  cbs2
00011  RESERVED
00100  cbe0
00101  cbe1
00110  cbe2
00111  RESERVED
01xxx  RESERVED
10000  lps0
10001  lpe0
10010  lpc0
10011  RESERVED
101xx  RESERVED
11000  mmd
11001  RESERVED
111xx  RESERVED
```

FIG.17F

LEXRA-COPROCESSOR0 REGISTER ACCESS INSTRUCTIONS

| 31    | 26 25 | 21 20 | 16 15 | 11 10         0 |
|-------|-------|-------|-------|------------------|
| COP0 010_000 | MFLX 00011 | rt | rd | 000 0000 0000 |
| 6 | 5 | 5 | 5 | 11 |

| 31    | 26 25 | 21 20 | 16 15 | 11 10         0 |
|-------|-------|-------|-------|------------------|
| COP0 010_000 | MTLX 00111 | rt | rd | 000 0000 0000 |
| 6 | 5 | 5 | 5 | 11 |

| ASSEMBLER MNEMONIC | Copz rs | rt | rd |
|---|---|---|---|
| MFLXC0 | MFLX | rt | rd |
| MTLXC0 | MTLX | rt | rd |

THESE ARE NOT LEXOP INSTRUCTIONS. THEY ARE VARIANTS OF THE STANDARD MTC0 AND MFC0 INSTRUCTIONS THAT ALLOW ACCESS TO THE LEXRA COPROCESSOR0 REGISTERS LISTED BELOW. AS WITH ANY COP0 INSTRUCTION, A COPROCESSOR UNUSABLE EXCEPTION IS TAKEN IN USER MODE IF THE Cu0 BIT IS 0 IN THE CP0 STATUS REGISTER WHEN THESE INSTRUCTIONS ARE EXECUTED.

rt

SELECTS GENERAL REGISTER r0-r31.

rd

SELECTS LEXRA COPROCESSOR0 REGISTER:

```
00000  ESTATUS
00001  ECAUSE
00010  INTVEC
00011  RESERVED
001xx  RESERVED
01xxx  RESERVED
1xxxx  RESERVED
```

FIG.17G

VII. CMOVE FORMAT

| 31   26 | 25   21 | 20   16 | 15   11 | 10 9 8 | 6 5   0 |
|---|---|---|---|---|---|
| LEXOP 011_111 | rs | rt | rd | 00 COND | SUBOP |
| 6 | 5 | 5 | 5 | 2  3 | 6 |

| ASSEMBLER MNEMONIC | rs | rt | rd | COND | LEXRA SUBOP |
|---|---|---|---|---|---|
| CMVEQZ[.H][.L] | rs | rt | rd | COND | CMOVE |
| CMVNEZ[.H][.L] | rs | rt | rd | COND | CMOVE |

<u>rs,rt,rd</u>

SELECTS GENERAL REGISTER r0-r31.

<u>COND</u>

CONDITION CODE FOR rT OPERAND REFERENCED BY THE CONDITIONAL MOVE.

```
000   EQZ
001   NEZ
010   EQZ.H
011   NEZ.H
100   EQZ.L
101   NEZ.L
11x   RESERVED
```

FIG.17H

HIGH PERFORMANCE RISC INSTRUCTION SET DIGITAL SIGNAL PROCESSOR HAVING CIRCULAR BUFFER AND LOOPING CONTROLS

I. RELATED APPLICATIONS

This application relates to provisional application Ser. No. 60/148,652 filed on Aug. 13, 1999, drawing priority therefrom.

II. BACKGROUND OF THE INVENTION

The present invention relates to the field of digital signal processor (DSP) architectures, and more particularly to DSP architectures with optimized architectures.

With the increasing commercial importance of DSP-intensive applications, such as wireless communication, modems, and computer telephony, has come an increasing recognition of the benefit of implementing DSP functions on a CPU. Not only are CPUs usually needed for memory management, user interface and Internet Protocol software, CPUs also have excellent third-party software tool support.

Implementing certain DSP algorithms, such as the FIR Filter or Discrete Cosine Transform (DC7), in software, however, may degrade performance up to an order of magnitude as compared to specialized DSPs. Another difficulty is the problem of deterministic real-time allocation in sophisticated CPUs.

Some vendors have tried to address these problems by offering auxiliary processing components. DSP coprocessors, for example, use separate instruction sets, instruction stores and execution units, and DSP accelerators share the same I-stream with the CPU but have separate execution units. These approaches, however, impose a substantial burden on the CPU in managing DSP functions.

III. SUMMARY OF THE INVENTION

Systems and method consistent with the present invention provide for an alternate DSP architecture configuration that allows for more efficient implementation of DSP algorithms and use of CPU resources.

A digital signal processor consistent with this invention comprises two execution pipelines capable of executing RISC instructions; instruction fetch logic that simultaneously fetches two instructions and routes them to respective pipelines; and control logic to allow the pipelines to operate independently.

Another digital signal processor consistent with this invention and capable of integrating subopcodes into an established CPU instruction set comprises a memory that stores instructions having opcodes; an instruction decoder that identifies a relocatable opcode to designate subopcodes; and a subopcode detector that decodes subopcodes if the instruction decoder identifies the relocatable opcode.

Still another digital signal processor consistent with this invention comprises a register pair; and means for executing a multiply instruction on a number stored in the register pair, including first means for performing multiply instructions on higher-order portions of each register in the register pair, second means for performing multiply instructions on the remaining portions of each register in the register pair, and third means for combining the results from the first and second means.

A circular buffer control circuit consistent with this invention comprises a first number of circular buffer start registers; a first number of circular buffer end registers, each associated with a different one of the circular buffer start registers; and circular buffer control logic including means for comparing a pointer to and address in a selected one of the circular buffer end registers, and means for restoring the address in the one of the circular buffer start registers associated with the selected circular buffer end register if the pointer matches the address in the selected circular buffer end register.

IV. BRIEF DESCRIPTION OF DRAWINGS

The accompanying drawings, which are incorporated in and constitute a part of this specification, illustrate one embodiment of the invention and, together with the description, serve to explain the objects, advantages, and principles of the invention. In the drawings:

FIG. 3 is a table indicating the instruction select logic consistent with this invention;

Figure 10:
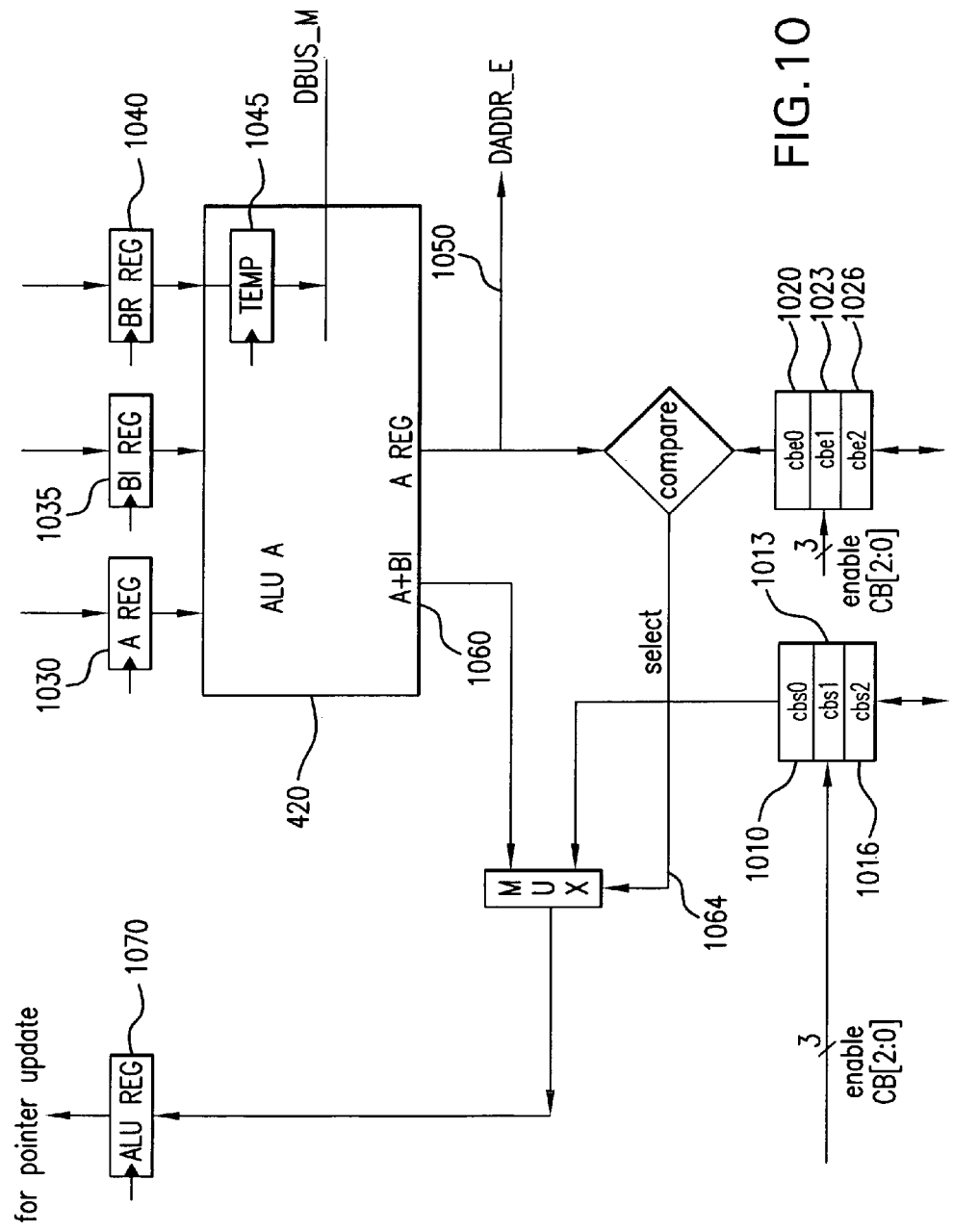
Figure 16:
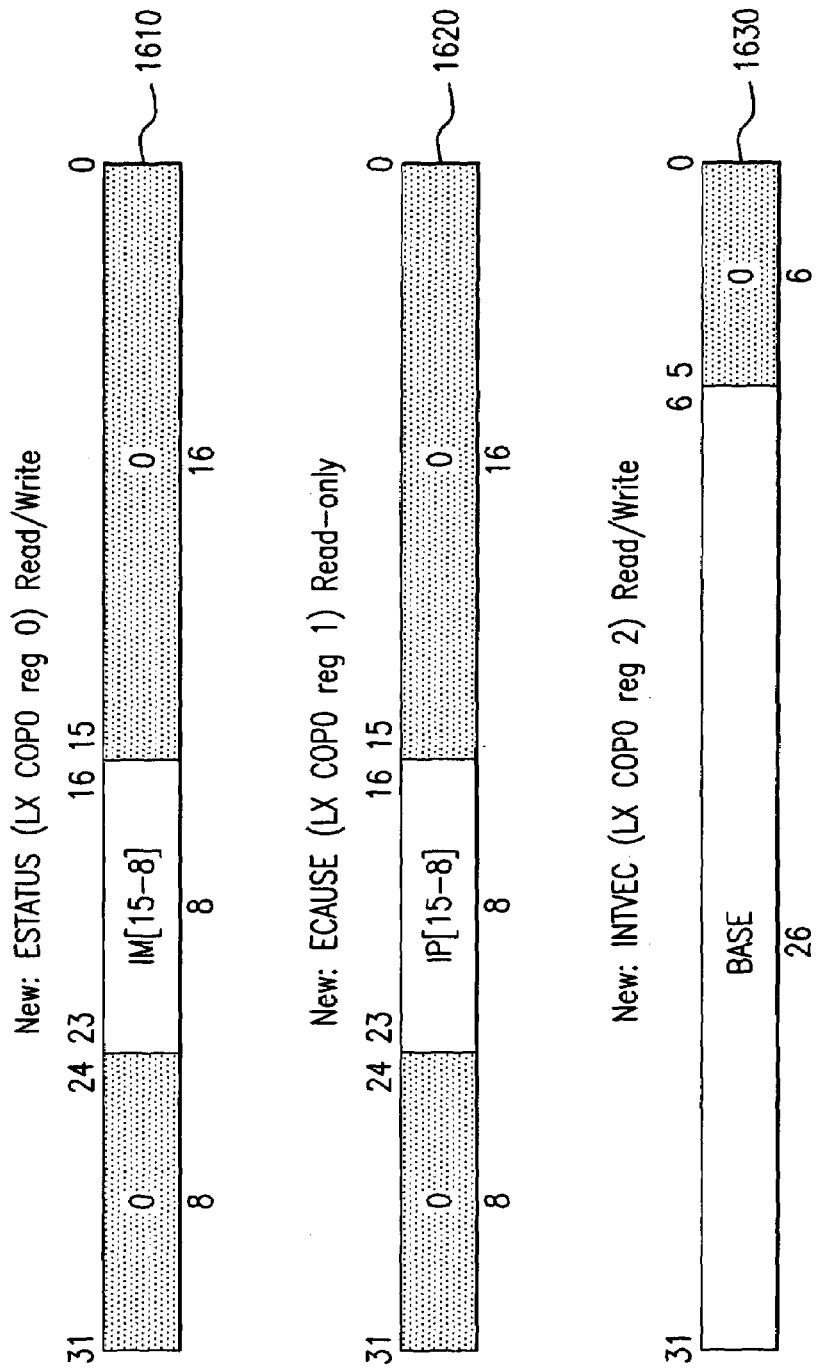

FIGS. 7A, 7B, and 7C show some of the data arithmetic modes;

FIGS. 8A, 8B, 8C, and 8D contain a table of the instructions supported by an implementation consistent with this invention;

FIG. 9 is a table showing the assignment of instructions to different pipelines;

FIG. 10 is a block diagram of circular buffers consistent with this invention;

FIGS. 11A, 11B and 11C show a table summarizing vector addressing instructions;

FIGS. 12A and 12B show a table with instructions when a saturation option is provided;

FIGS. 13A and 13B show a table with additional ALU operations;

FIG. 14 contains a table with conditional operations;

FIG. 15 contains a table with the cycles required between instructions;

FIG. 16 is a block diagram of several coprocessor registers; and

FIGS. 17A–H illustrate additional LEXOP codes.

V. DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

A. Overview

Performance critical DSP algorithms such as FIR filters need to perform multiply-accumulate on memory-based operands. Typically, DSP architecture have a CISC instruction set with memory-based operands. RISCs on the other hand have load/store architectures and register operands. Extending the RISC into DSP with superscalar issue allows one instruction to load the register from memory and another to execute on register-based operands that were loaded earlier.

A RISC-DSP consistent with the present invention can achieve a system clock speed of 200 MHZ and a peak computational power of 400 million multiply-accumulate (MAC) operations per second when implemented in 0.18 µm technology, which is comparable to the highest-performance DSPs available. Also, tightly integrating DSP extensions into an existing instruction set, such as the MIPS ISA, gives access to a wide variety of third-party tools and allows programmers to switch seamlessly from RISC code to DSP code. The extensions include (1) multiply-accumulate (MAC) instructions, including guard bits (with support for fractional arithmetic mode), and saturation and rounding for high-fidelity DSP arithmetic operations that have not previously been available in RISC processors, (2) dual 16-bit versions of all ALU operations, (3) post-modified memory pointers with hardware circular buffer support, (4) zero-overhead loop counter, which can be interrupted and nested, (5) conditional move, (6) specialized ALU operations, (7) prioritized low-overhead interrupts, and (8) load/store of two 32-bit general registers with a single instruction.

These ISA extensions are accomplished by introducing an I-Format opcode called LEXOP, which creates 64 additional subop codes encoded in INST[5:0].

Figure 1:
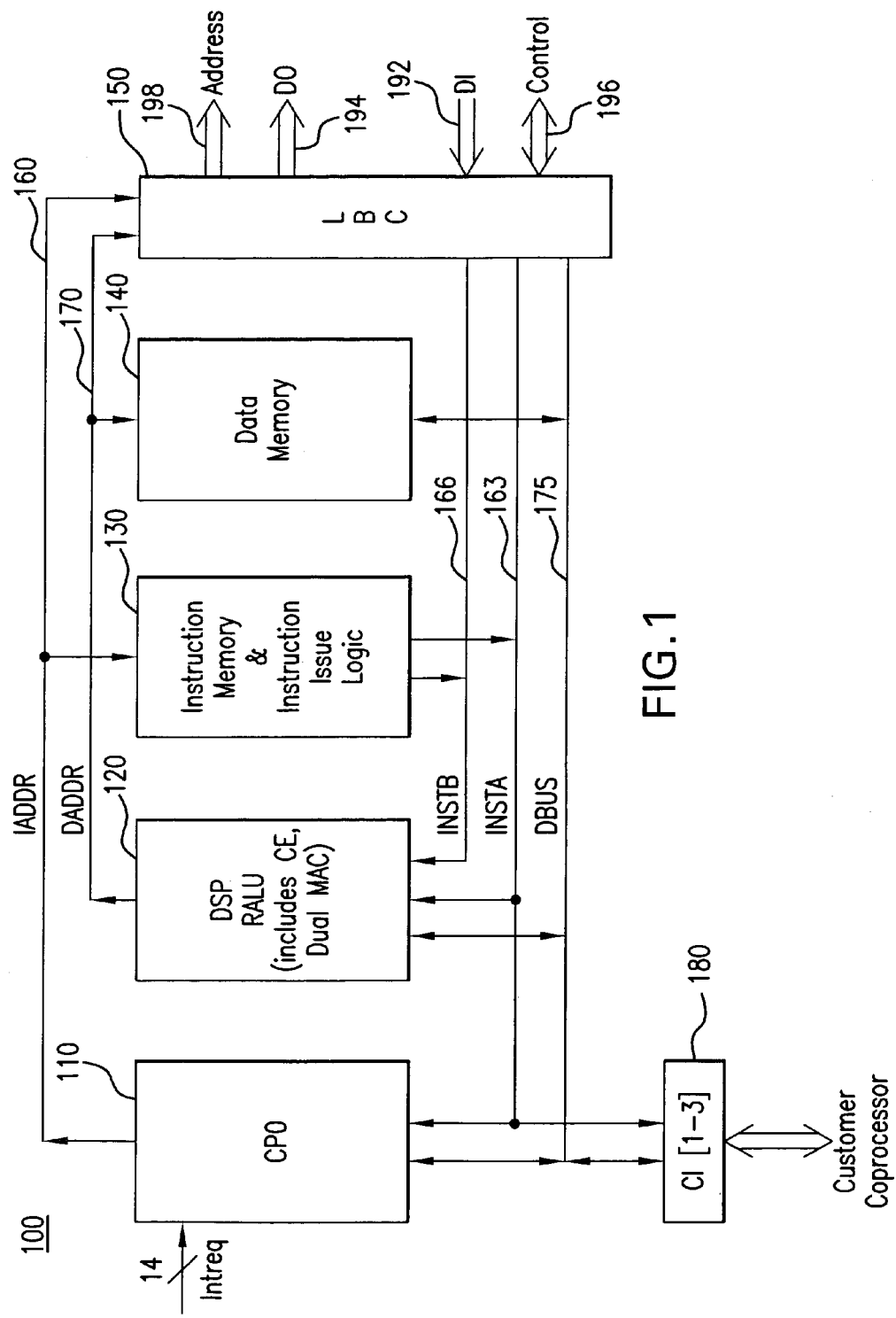
FIG. 1 is a block diagram of a DSP architecture consistent with this invention.

FIG. 1 shows an example of a DSP 100 having an architecture consistent with this invention. DSP 100 includes a Coprocessor 0 (CP0) 110, a Register File Arithmetic Logic Unit (RALU) 120, instructions memory and issue logic 130, data memory 140, and LBC 150. IADDR (instruction address b) bus 160 links Coprocessor 0 110, instruction memory and issue logic 130, and LBC 150. DADDR (data address) bus 170 links RALU 120, data memory 140, and LBC 150. Instruction pathways INSTA 163 and INSTB 166 connect between CP0 110, RALU 120, instruction memory and issue logic 130, and LBC 150. DBUS (data bus) 175 connects between CP0 110, RALU 120, data memory 140, and LBC 150.

CI (customer interface) 180 acts as an interface to a customer coprocessor and connects to INSTA pathway 163 and DBUS 175. LBC 150 also interfaces to DI (data in) bus 192, DO (data out) bus 194, address bus 198, and control bus 196.

One implementation of the DSP consistent with this invention adds a stage to a dual-issue, five-stage pipeline to form dual-issue six-stage pipelines. The additional stage is a D (Decode) stage. This superpipeline design can achieve higher performance and isolate the processor's logic from customer-supplied instruction memories. Sustained performance near the peak 400 million MACs per second can be realized for inner loops of key DSP algorithms.

One pipeline is preferably a load/store pipe. It includes data memory access and all instructions except multiply and divide operations. Another pipeline is preferably a multiply-accumulate pipe. It includes a MAC and ALU, each with dual 16-bit operations.

Preferably, DSP algorithms will use the load/store pipe to load a pair of operands into a general register while executing dual MAC operations in multiply-accumulate pipe on earlier data. Decoupling register loads from the MAC processing allows loop unrolling and takes effective advantage of the thirty-two general registers for temporary storage. In addition, dual-issue allows the DSP to achieve the memory bandwidth required by DSP within a RISC architecture, and dual 16-bit SIMD operations take full advantage of the 32-bit RISC datapaths.

B. Description of Key Components and Features
1. Superscalar Architecture

Figure 2:
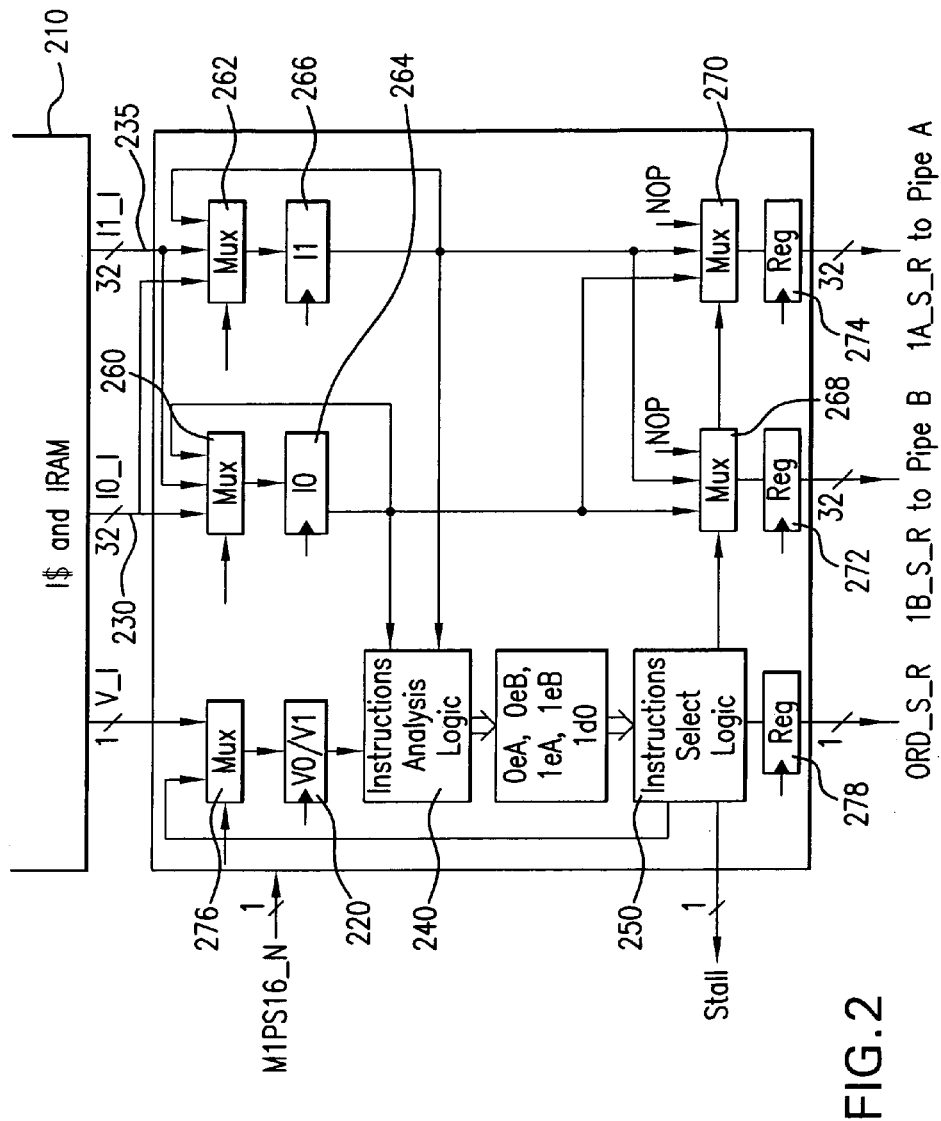
FIG. 2 is a data flow diagram of the superscalar instruction issue consistent with this invention.

As explained above, a DSP consistent with this invention preferably issues dual 32-bit instructions to two distinct six-stage execution pipelines. FIG. 2 shows data paths for the instruction issue. An instruction cache and IRAM 210 in instruction memory and issue logic 130 (FIG. 1) can fetch two 32-bit instructions simultaneously. Following the superscalar instruction buffer and issue logic described below, the instructions issue as IB_S_R to one pipeline, called Pipe B and IA_S_R to the other pipeline, called Pipe A. Pipe A would be the "load/store pipe" described above because it uniquely supports the load and store operations. Pipe B, then, would be the multiply-accumulate pipe.

The dual-issue design offers significant performance advantages. For example, peak computational performance for DSP algorithms typically requires at least one memory operand per instruction cycle. The dual-issue superscalar design, on the other hand, allows a memory operand to be loaded by one instruction while the MAC operates on earlier register-based data.

The RISC data path is 32-bits, but few DSP algorithms require more than 16-bits of precision. This allows the simultaneous fetching of two values from memory, which further improves performance.

The six stages of the execution pipelines are as follows:

| Stage 1 | I | Instruction fetch |
| Stage 2 | D | Decode |
| Stage 3 | S | Source fetch |
| Stage 4 | E | Execution |
| Stage 5 | M | Memory data select |
| Stage 6 | W | Write back to register file |

To avoid degrading performance, the superscalar issue logic can operate during the Decode-Stage of the pipeline that occurs after I (Instruction Fetch) and before S (Source Fetch). The D stage allows a better system clock cycle time over that of a five-stage pipeline. Support for fully synchronous instruction memories also isolates the processor logic from the customer-supplied memories, which facilitates integration.

Although the D-Stage incurs a two-cycle penalty on branch prediction failure as compared to the one-cycle penalty from a five-stage pipeline, the effect of this penalty does not usually manifest. For example, because branches are predicted taken in all cases, no wasted cycles are incurred for backward branches used as loop counters except in the final cycle where the loop "falls through."

A two-bit Valid register 220 (V0 and V1) is updated with each fetch to indicate whether instructions I0 230 and I1 235 are valid. The Valid register can indicate three states: (1) "neither valid," which occurs following a cache miss, (2) "both valid," which occurs following a cache hit; or (3) "V0=invalid/V1=valid," which occurs following a branch to I1. Later, one or both instructions may issue to Pipes A and B. If only one instruction from a valid pair (e.g., 10) issues, Valid register 220 will be appropriately updated and instruction fetch will be stalled while the second instruction issues. V0=invalid/V1=valid occurs following a branch to I1. V0=valid/V1=invalid will not occur because preference is given to I0 (the first instruction in program order) if only one instruction can issue. The next instruction I1 issues before fetching a new pair of valid instructions, I0/I1.

Decoding register 220 belongs to instruction analysis logic 240, which, along with the Instruction Select logic, is implemented in the D-Stage. Instruction analysis logic 240 generates five key signals: 0eA, 1eA, 0eB, 1eB and 1d0. 0eA indicates whether I0 can execute in Pipe A. This decision is based on the I0 opcode and the resources available in Pipe A.

For example, if I0 is an ADD and Pipe A can execute an ADD, then 0eA=1; if I0 is a MAC and Pipe A has no MAC then 0eA=0. The complexity of this logic can be minimized by careful encoding operations and by careful partitioning of operations between the two Pipes. One simplification could be to partition the DSP partition so that the Pipe B instruction, IB_S_R, is routed only to RALU 120 (FIG. 1).

A special signal 1d0 indicates that both I0, I1 are valid and I1 (the higher logical order) depends on I0. This will occur if the result of I0 is used as a source by I1. In this case, only I0 will issue. Analysis of the other signals is shown below:

| Signal | Meaning |
|---|---|
| 0eA | I0 is valid, I0 can be executed in Pipe A |
| 1eA | I1 is valid, I1 can be executed in Pipe A |
| 0eB | I0 is valid, I0 can be executed in Pipe B |
| 1eB | I1 is valid, I1 can be executed in Pipe B |
| 1d0 | I0, I1 are valid and depends on I0: source of I1 = destination of I0, or I1 updates register file and I0 post-modifies load/store pointer |

Based on the Instruction Analysis, instructions are issued to Pipes A and B. Three outcomes are possible for each Pipe,
IA(IB)←I0
IA(IB)←I1
IA(IB)←NOP Data flow is effected by input multiplexers 260, 262, instruction registers 264, 266, output multiplexers 268, 270, and output registers 272, 274. An input multiplexer 276 and an output register 278 are associated with Valid register 220.

Instruction select logic 250 controls output multiplexers 268, 270 according to Table 300 in FIG. 3. Table 300 also specifies the update to the Valid register as a consequence of the issue decision.

"V←next" in Table 300 indicates that I0/I1 are updated with a new instruction pair (following cache load) and both are valid, unless a branch to an odd address occurs. In that case, I0 is not valid and I1 is valid. If two instructions are valid, but only one instruction issues, the signal "Stall" will be active to stall the instruction fetch by one cycle until the 2nd instruction has issued.

The Order Register ORD, which lies in instruction memory and issue logic 130 (FIG. 1) indicates which instruction is first in program order. For example if IA←I1 and IB←I0, then ORD←"B" to indicate that the instruction in Pipe B is first in program order. ORD must be examined by later-stage control in two cases. First, if both instructions attempt to write the same general register, ORD will select the latter in program order. Second, if both instructions generate exceptions, ORD will select the address of the earlier instruction into the Exception PC (EPC) register. This logic is preferably executed during the D-Stage. IB_S_R, IA_S_R and ORD_S_R issue from registers on the rising edge of the S-Stage clock cycle, and are broadcast to other sections.

To improve performance, the DSP's superscalar implementation can use a "sliding" two-instruction buffer with a third instruction register, I2. If only one instruction (I0) issues, the contents of I1 are shifted into I0, the contents of I2 are shifted into I1 and a new instruction is fetched into I2. As a result, a pair of instructions will always be available in I0 and I1 for potential dual issue, except for the cycle following a branch or jump.

The third instruction buffer register I2 is required because another pair of unaligned instructions must be available for use, following the dual issue of an unaligned instruction pair (I0 and I1 addresses are not both on the same factor-of-8 boundary). If memory fetches only aligned instruction pairs, a third instruction buffer is required.

The compression signal indicates whether code compression has been enabled. When compression is enabled, each 32-bit fetch is interpreted as a pair of 16-bit instructions. Upon fetching I0(32), the first 16-bit instruction of the pair will be loaded into I0 REG and the second into I1 REG. Similarly, when I1(32) is fetched, the first instruction of the pair will be loaded into I0 REG and the second into I1 REG. D-Stage logic follows the approach previously described with the shorter instruction (e.g., 16-bit) opcodes being analyzed for potential issue, then selected into IB REG and IA REG. The critical Register File read addresses for shorter instruction opcodes are resolved during the D-stage so that register file access for shorter instructions, as for longer (e.g., 32-bit) instructions, can begin on the rising edge of the S-Stage clock. The state of I0 valid and I1 invalid does not occur because there is no out-of-order execution.

2. RALU Datapath

Figure 4:
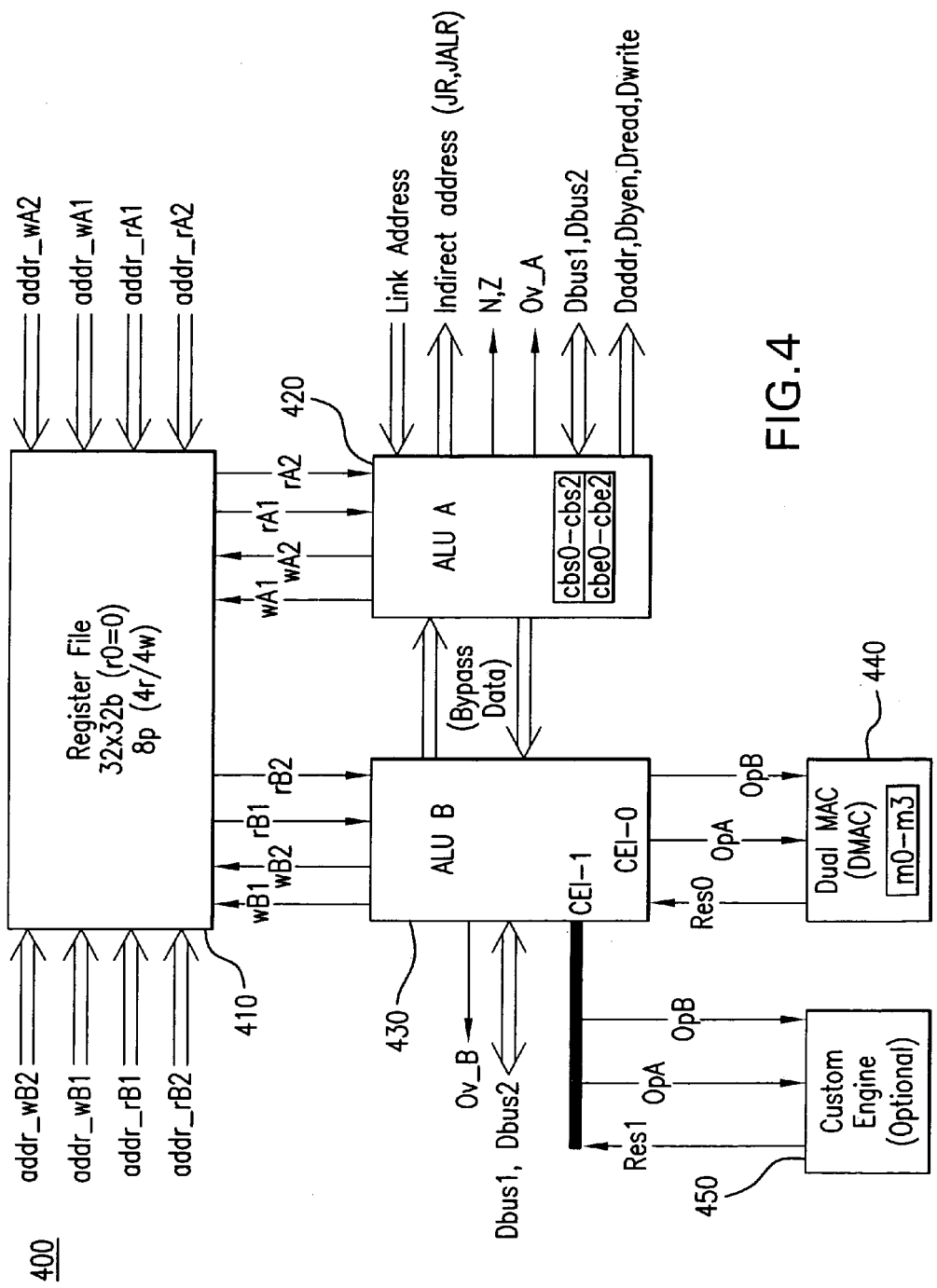
FIG. 4 shows a superscalar RALU datapath consistent with this invention.

FIG. 4 illustrates the Superscalar RALU datapath 400 consistent with this invention. Operations are divided between Pipe A and Pipe B in such a way that RALU 120 (FIG. 1) is the only major section of the processor which requires both Pipe A and B instructions. Coprocessor 0 110, as well as the customer-defined coprocessors 1–3 (not shown), only require the Pipe A instruction.

An 8-port (4-read/4-write) general register file 410 supports the dual execution pipelines. The 8-port architecture allows a large portion of both pipes to be fully replicated, simplifying design and improving likelihood of two instructions being able to dual issue.

As FIG. 4 shows, ALU A 420 and ALU B 430 connect to register file 410 through the respective read and write ports. In each pipe, one write port is dedicated to register file updates from the data bus (e.g., loads, or MFCz, CFCz—moves from a coprocessor). The remaining three ports (two read ports and one write port) are available for the other operations assigned to that Pipe. As a result, loads, including "twinword" loads of register pairs can dual-issue with any MAC or ALU instruction assuming no data-dependency. The nomenclature "twinword" distinguishes these operations from "doubleword" operations which (in other extensions) access a single 64-bit general register. The "twinword" load/store (Load/Store of pairs of 32-bit registers (e.g., r16, r17) in one 64-bit transfer from memory) allow the dual MACs to be kept busy at all times.

All ALU operations are available in both Pipe A and Pipe B. DSP extensions to memory addressing, such as pointer post-modification and circular buffer addressing described below, are preferably unique to Pipe A. Also, coprocessor operations and all "sequencing control instructions" (branches, jumps) are unique to Pipe A. As a result, Pipe B instructions are not routed to the coprocessors. This is shown in FIG. 4 with ALU B being connected to Custom Engine Interface (CEI) 450 and dual MAC 440, which preferably resides in RALU 120 (FIG. 1). CEI 450 is optionally available for customer proprietary operations only in Pipe B. This feature allows the customer extensions to maintain high throughput since they can dual-issue with Load and Store instructions which issue to Pipe A.

3. MMD register

Figure 5:
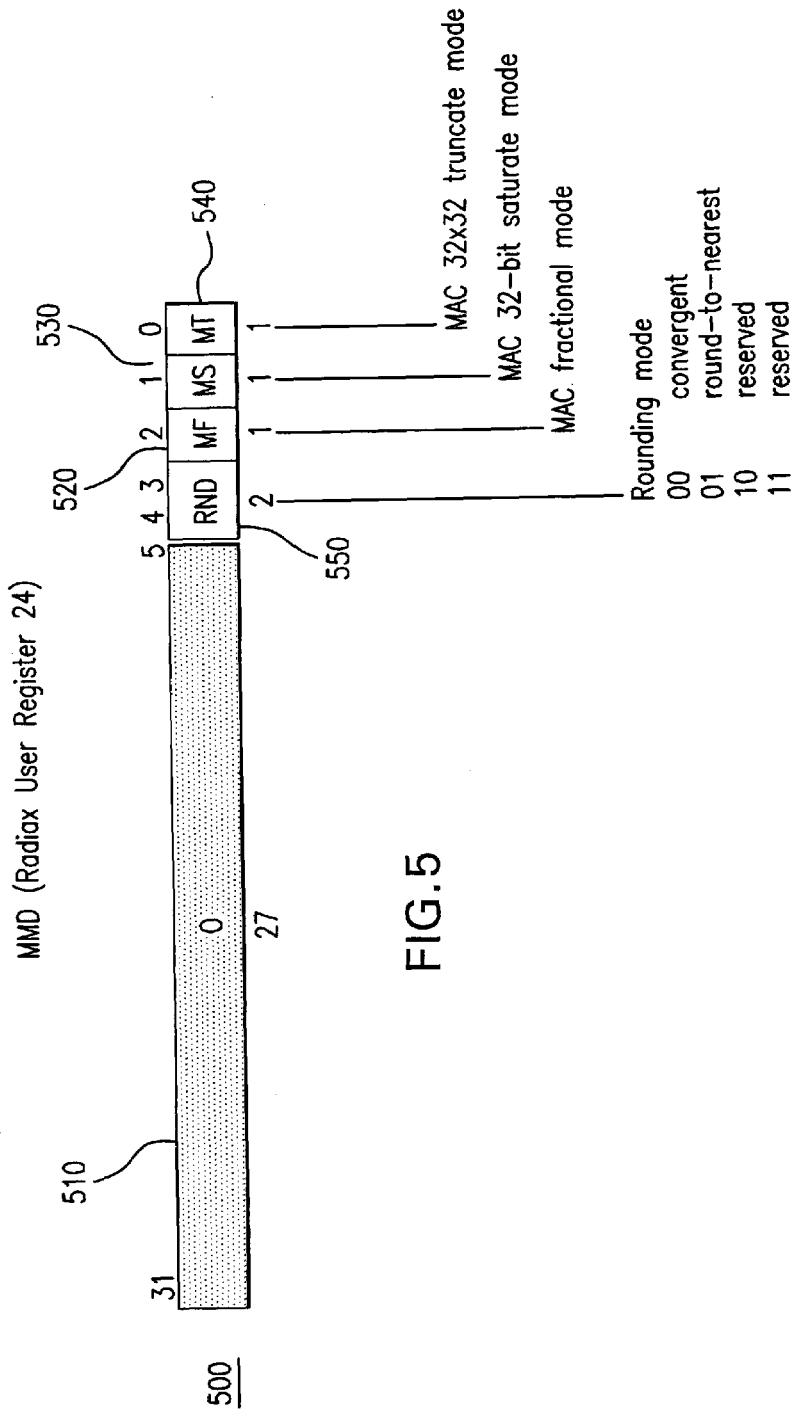
FIG. 5 shows an example of a MMD register consistent with this invention.

FIG. 5 shows MAC Mode ("MMD") register 500, which is preferably a new Radiax User register (24) that is accessed using Radiax User Move instructions MTRU and MFRU.

MMD register 500 is read using the MFLXC0 instruction, a variant of the MFC0 instruction and is loaded using a MTLXC0 instruction, a variant of the MTC0 instruction. Field 510 [31–5] are the mask bits for eight low-overhead interrupts described below. Field MF 520 selects arithmetic mode for multiplies in the Dual Mac. A "0" means use integer arithmetic mode, and a "1" means use fractional arithmetic mode.

Field MS 530 selects saturation boundary in the Dual Mac accumulators as follows. A "0" means saturate at 40 bits, and a "1" means saturate at 32 bits. Field MT 540 selects truncation of 32×32 bit multiplies in the Dual Mac. A "0" means perform full 32×32 bit multiply (sum all four partial products), and a "1" means omit partial product rX[15:00]×rY[15:00] when performing 32×32 bit multiply.

Field RND 550 selects the rounding mode used in the RNDA2 instruction. A "00" means convergent rounding, and a "01" means round to nearest number. In convergent rounding, which is sometimes called "round-to-nearest-even," the numbers are rounded to the nearest number. When the number to be rounded is midway between two numbers representable in the smaller format, round to the number is rounded to the even number. The rounded result will always have 0 in the lsb. If the lsb left of the roundoff point is random, convergent rounding is unbiased.

In rounding to the nearest number, the number is rounded to the more positive number when the number to be rounded is midway between two numbers representable in the smaller format. This rounding mode is common because it is easily implemented by always adding 0 . . . 0.10 . . . 0 to the number to be rounded. Digits to the right of "A" are dropped after rounding. Upon reset all bits in the MMD register 500 are initialized to 0.

4. MAC Datapath

Figure 6:
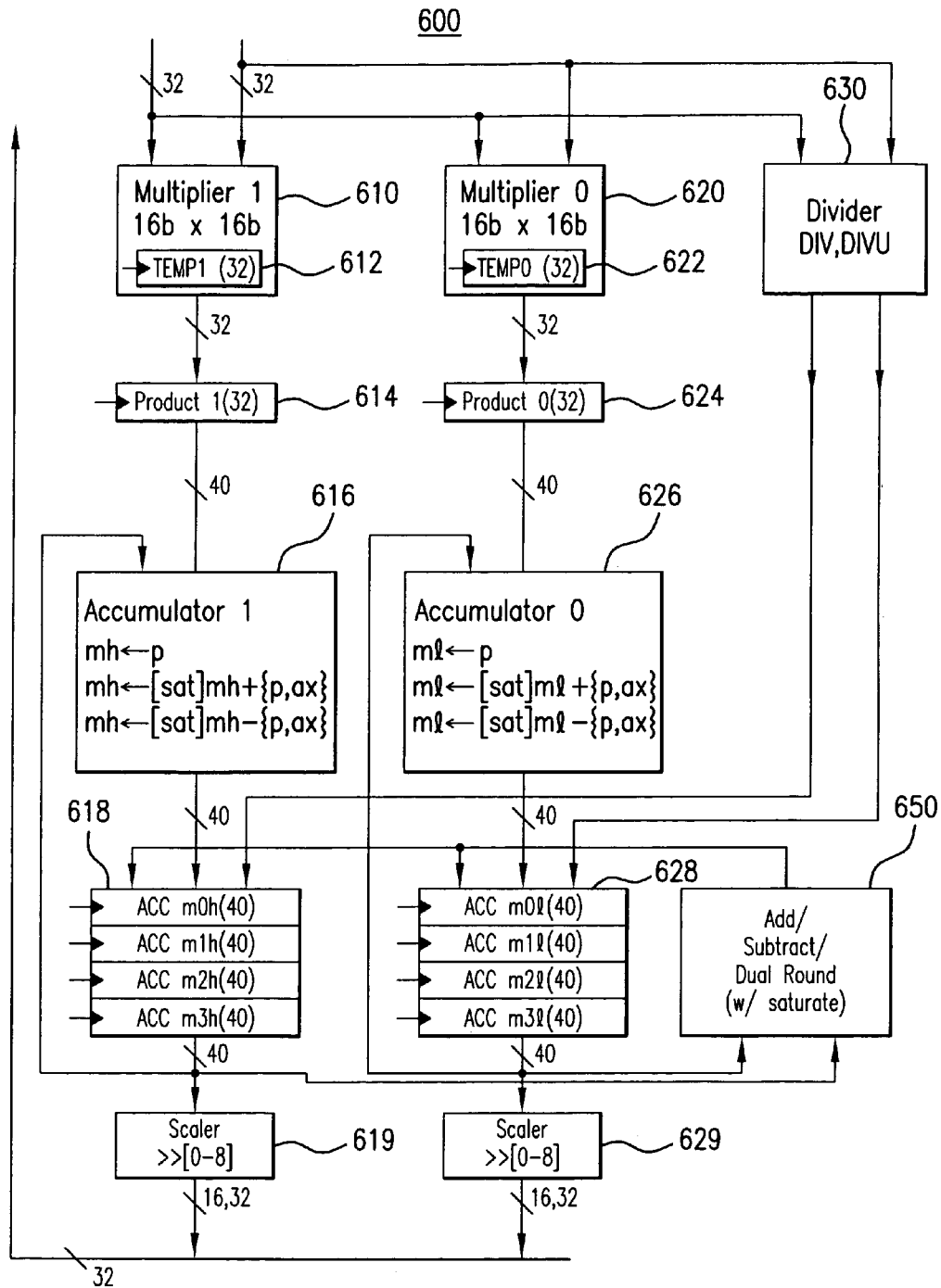
FIG. 6 is an illustration of a dual MAC datapath consistent with this invention.

FIG. 6 illustrates a Dual MAC datapath 600 consistent with this invention. The major subsystems are two 16-bit multiply-accumulate datapaths 610 and 620, each with a temporary register 612 and 622, respectively, and divide unit 630. Each multiplier 610 and 620 feeds a corresponding 32-bit product register 614 and 624, two accumulator units 616 and 626, four 40 bit accumulator registers 618 and 628, and output scalers 619 and 629. A 40-bit Add/Subtract/Dual Round Unit 650 provides optional saturation and overflow for the two accumulators 616 and 626.

Multiply-accumulate datapaths can operate on 16-bit input data, either individually or in parallel. Preferably, the same assembler mnemonic is used for individual or parallel operation. The output register specified determines whether MAC0 or MAC1 or both, operate. For example,

```
MADDA2 m0l, r2, r3 // MAC0:  m0l ←m0l + r2[15:00] * r3[15:00]
                   // MAC1:   IDLE
MADDA2 m0h, r2, r3 // MAC0:   IDLE
                   // MAC1:  m0h ←m0h + r2[31:16] * r3[31:16]
MADDA2 m0, r2, r3  // MAC0:  m0l ←m0l + r2[15:00] * r3[15:00]
                   // MAC 1: m0l ←m0l + r2[31:16] * r3[31:16]
```

Each multiplier 610 and 620 can initiate a new 16×16-bit product every cycle (single cycle throughput). Each 16×16-bit multiply-accumulate preferably completes in three cycles.

Temporary registers 612 and 622 and product registers 614 and 624 show that multipliers 610 and 620 require two cycles, but have single cycle throughput. Temporary registers 612 and 622, and product registers 614 and 624, however, are preferably not accessible by the programmer. Thus, there are two delay slots for multiplication or multiply-accumulate. For example,

```
Inst 1: MADDA2    m1h, r2, r3
Inst 2: delay slot 1            // new m1h is not available
Inst 3: delay slot 2            // new m1h is not available
Inst 4: MFA       r3, m1h       // new m1h is available
```

M1h can be referenced by MFA in Inst2 (Inst3), but two (one) stall cycles will be incurred. The number of stall cycles in DSP algorithms are expected to be minimal because many products are often accumulated before the accumulator output must be stored. In a 64-tap FIR, for example, sixty-four terms are accumulated before the filter sample is updated in memory. Also, the four accumulator pairs allow loops to be "unrolled" so that up to three additional independent MAC operations can be initiated before the result of the first is available.

Compared to a typical RISC multiply-accumulate unit, a MAC consistent with this invention includes a number of features critical to high-fidelity DSP arithmetic, such as accumulator guard bits, fractional arithmetic, saturation, rounding, and output scaling. These features are optionally selected by opcode and/or mode bits in MMD register 500, and are compatible with conventional integer arithmetic.

FIGS. 7A, 7B, and 7C show some of the data arithmetic modes consistent with the present invention. These modes are used to select between several available options for the following features of the MAC's arithmetic: (i) truncation mode, (ii) saturation mode, (iii) fractional/integer arithmetic mode, and (iv) rounding mode. These modes and their optional settings are discussed below.

Accumulation is preferably performed at 40-bit precision, using eight guard bits for overflow protection. The alternative is to require the programmer to right-shift (scale) products before accumulation, which complicates programming and causes loss of precision. Before accumulation, the product is sign-extended to 40-bits. With guard bits, the only loss of precision will typically occur at the end of a lengthy calculation when the 40-bit result must be stored to the general register file or to memory in 32-bit or 16-bit format.

Fractional arithmetic is implemented by the program's interpretation of the 16-, 32- or 40-bit quantities and is controlled by a bit in the MMD register 500. When fractional mode is selected, the dual MAC shifts the results of any multiply operation left by one bit to maintain the alignment of the implied radix point. Furthermore, since (−1) can be represented in fractional format but +1 cannot, in fractional mode the dual MAC detects when both operands of a multiply are equal to (−1). When this occurs, it generates the approximate product consisting of 0 for the sign bit (representing a positive result) and all 1's ones for the remaining bits. This is true for both 16×16-bit and 32×32-bit multiplications. The least significant bit of a product is always zero in fractional mode (due to the left shift).

The accumulation units can add the product to, or subtract it from, one of the four accumulator registers 618 and 628. This operation can be performed with optional saturation; that is, if a result overflows (underflows), the accumulator is updated with the largest (smallest) positive (negative) number rather than the "wraparound" result with incorrect sign. The DSP instructions preferably include a multiply-add and multiply-sub instruction, each with and without saturation. There are also instructions for adding or subtracting any pair of 40-bit accumulator registers together, with and without saturation. A bit in the MMD register determines whether the saturation is performed on the full 40-bits or whether saturation is performed at 32 bits. The latter capability is useful for emulating the results of other architectures that do not have guard bits.

When the instruction requires multiplication, but no accumulation, the product is passed through the accumulation unit unchanged. (Thus, both 16-bit multiplication and multiply-accumulate require three MAC cycles.)

A Round instruction can also be executed on one (or a pair) of the accumulator registers to reduce precision prior to storage. The rounding mode is selectable in MMD register 500. The output scalers 619 and 629 are used to right shift (scale) the accumulator register when it is transferred to the general register file.

The dual MAC configuration consistent with the present invention is also used to execute the 32-bit MULT(U) and DIV(U) instructions specified in, for example, the MIPS ISA. In the case of MULT(U), one of the 16-bit Multiply-Accumulate datapaths works iteratively to produce the 64-bit product in five cycles. The least significant 32 bits are available one cycle earlier than the most significant 32 bits. MMD register 500 mode bits have no effect on the operation of the standard MIPS ISA instructions. By contrast, the MULTA instruction is subject to MMD register 500 mode bits for fractional arithmetic and truncated 32×32-bit multiplication.

For the DSP MULTA, an accumulator pair M0*h*[31:0]/M01[31:0], M1*h*[31:0]/M11[31:0] etc. is the target. M0*h*[31:0] is aliased to HI; M01[31:0] is aliased to LO. Unlike the (dual) 16-bit operations, single-cycle throughput is not available for 32-bit data. Because there are two available data paths, however, two 32×32-bit multiply operations can be initiated every four cycles. The Dual MAC hardware configuration consistent with this invention automatically allocates the second operation to the available data path. If a third 32-bit multiplication is programmed too soon, stall cycles are inserted until one of the data paths is free.

The Dual MAC configuration consistent with this invention also supports a complex multiply instruction, CMULTA. For this instruction, each of the 32-bit general register operands is considered to represent a 16-bit real part (in bits 31:16) and a 16-bit imaginary part (in bits 15:00). One of the multipliers calculates the real part (32 bits) of the complex product (namely XrYr−XiYi) and stores it in the "h" half of the target accumulator pair. The other multiplier calculates the imaginary part (32 bits) of the complex product (namely XrYi+XiYr) and stores it in the "I" half of the target accumulator pair. This instruction can be initiated every two cycles (2-cycle throughput) and takes four cycles to complete. As in the other Dual MAC operations, programming CMULTA instructions too close together causes stall cycles but the correct results are always obtained.

The Dual MAC configuration consistent with this invention includes a separate Divide Unit 630 for executing the 32-bit DIV(U) operations specified by the MIPS ISA. The Divide requires 19 cycles to complete. The quotient is loaded into M01[31:0], M11[31:0], M21[31:0], or M31[31:0], and the remainder is loaded into the lower 32-bits of the other accumulator in the target pair. There is no special support for fractional arithmetic for the DIV operations.

Because the Dual MAC configuration consistent with this invention is capable of consuming four 16-bit operands every cycle (in Pipe B) by performing two 16×16 bit multiply-accumulates, it is desirable to be able to fetch four 16-bit operands from memory every cycle (in Pipe A). Therefore, the DSP extends the MIPS load and store instructions to include twinword accesses and implements a 64-bit data path from memory. A twinword memory operation accesses an (even-odd) pair of 32-bit general registers with a single instruction and executes in a single pipeline cycle.

Like the standard byte, halfword, and word load/store instructions, the twinword load/store instructions use a register and an immediate field to specify the memory address. However, to fit into the format, the available signed 11-bit immediate field (called the displacement) is considered a twinword quantity, so is left-shifted by 3 bits before being added to the base register. This is equivalent to a 14-bit byte offset, in comparison to the full 16-bit immediate byte offset used in the byte, halfword and word instructions. Also, the target register pair for the twinword load/store must be an even-odd pair, so that only 4 bits are used to specify it.

DSP algorithms usually operate on vectors or matrices of data; for example Discrete Cosine Transforms operate on 8×8 pixel blocks. As a result, data memory pointers are incremented from one operand to the next. The extra instruction cycle required to increment RISC memory pointers is eliminated in DSPs with auto-increment. Memory pointers are used unmodified to create the address, then updated in the general register file before the next use:

address←pointer pointer←pointer+stride

The 8-bit immediate field containing the stride is sign-extended to 32-bits before being added to the pointer for the latter's update. The nomenclature "pointer" distinguishes the update performed after memory addressing, as opposed to the "base" register (in the MIPS ISA), which is augmented by the offset before addressing memory in the standard instructions. The nomenclature "stride," which depends on the granularity of the access, distinguishes it from the invariant byte offset used in the standard load and store instructions. For twinword/word/halfword addressing the 8-bit field is first left-shifted by three/two/one places and zero-filled, before sign extension to 32-bits. This use of left shifts for the twinword, word, and halfword strides is similar to the MIPS 16 ASE and is used to extend the effective address range. Thus, increments of between −128 and +127 twinwords, words, halfwords or bytes are available for each data type.

In the case of Loads (but not Stores) pointer update requires a second general register file write port. An 8 port (4read/4write) register file has two of the four write ports dedicated to register Loads. As a result, twinword loads can execute in parallel with any Pipe B operation. FIGS. 8A, 8B, 8C, and 8D contain a Table 800 of the instructions supported by an implementation consistent with this invention. FIG. 9 contains a Table 900 showing the assignment of instructions to Pipe A and Pipe B.

5. Circular Buffers

For some DSP algorithms, notably filters, DSP data is organized into "circular buffers." In this case, the next reference after the end of the buffer is to the beginning of the buffer. Implementing this structure in RISC requires:

| Inst 1: | LW | reg, AddressReg |
| Inst 2: | BNEL | AddressReg, BufferEnd, Continue |
| Inst 3: | ADDIU | AddressReg, AddressREG + 4 |
| Inst 4: | MOVE | AddressReg, BufferStart |
| Continue: | | |

The above example is written so that a branch prediction failure will only be incurred at the end of the buffer. Nevertheless, the combination of post-modified pointers together with hardware support for circular buffers allows reducing this typical DSP addressing operation from four cycles to one.

FIG. 10 is a block diagram illustrating circular buffer start registers (cbs 0 1010, cbs 1 1013, and cbs2 1016) and circular buffer end registers (cbe0 1020, cbe1 1023, and cbe2 1026) preferably located in ALU A 420 (FIG. 4). The circular buffer control logic is quite sophisticated in dealing with different data widths and decrement and well as increment of the circular buffer pointer.

The DSP supports three circular buffers. To initialize the circular buffers, MTALU (Move to ALU) instructions are used to set the twinword start addresses cbs 0 1010, cbs 1 1013, and cbs 2 1016[31:3] and the twinword end addresses cbe 0 1020, cbe 1 1023, and cbe 2 1026 [31:3]. Circular buffers are only used when memory pointers are post-modified, and consist of an integral number of twinwords.

When a circular buffer pointer is used in a post-modified address calculation, the pointer is compared to the associated cbe address. If they match (and the stride is non-negative), the cbs address (rather than the post-modified address) is restored to the register file. Similarly, to allow for traversing the circular buffer in the reverse direction, the pointer is compared to the cbs address; if they match (and the stride is negative) the cbe address (rather than the post-modified address) is restored to the register file.

Also in FIG. 10 are AREG 1030, which holds the memory pointer, BIREG 1035, which holds the "stride" by which the memory pointer is modified, BRREG 1040, which holds the date to be stored in the case of store instructions, and TEMP 1045, which holds a pipeline stage register DADDR_E 1050. The contents of AREG 1030 are transferred to DADDR_E 1050 as the memory address.

A+BI 1060 is the memory pointer modified by the stride; Select signal 1064 indicates whether the memory pointer matches the circular buffer end address; and ALUREG 1070 is the output of the ALU. In this case, ALUREG 1070 holds the modified pointer that will be used in the next such memory address.

Circular buffers can also be accessed with byte, halfword, or word Load/store with Pointer Increment instructions. In those cases, the several least significant bits of the pointer register are examined to determine if the start or end of the buffer has been reached, taking into account the granularity of the access, before replacing the pointer with the cbs or cbe as appropriate.

Any general register memory pointer can be used with circular buffers using the ".Cn" option. To use general register rP as a circular buffer pointer, for example, the instruction LWP.C2 r3, (r4)stride associates the r4 memory pointer with circular buffer C2 defined by the start address cbs 2 1016 and end address cbe 2 1026. FIGS. 11A, 11B, and 11C contain a Table 1100 summarizing vector addressing instructions with the implementation described above.

6. Instruction Extensions

The DSP accommodates extensions to the standard instruction sets, such as the MIPS instruction set, to support dual 16-bit operations, and also introduces a number of additional ALU instructions that improve performance on DSP algorithms. Supporting high-performance, dual 16-bit operations in the RISC-DSP requires supporting not only dual MAC instructions but also dual 16-bit versions of other arithmetic operations that the programmer may require.

In general, 16-bit immediates are not supported because the DSP extensions are encoded using the INST[05:00] "subop" field. Although dual 16-bit versions of logical operations such as AND may not be required, dual 16-bit versions have been provided for all 3-register operand shifts and add/subtracts. In a preferred implementation, the character "2" in the assembler mnemonic indicates an operation on dual 16-bit data.

DSP algorithms are often somewhat tolerant of data errors. A bad audio sample, for example, may cause a brief distortion, but no lasting effect as new audio samples arrive and the bad sample is cleared out of the buffer. Accordingly, the saturated result of signed arithmetic is a closer, more desirable, approximation than the wraparound result. Therefore, all arithmetic operations that may potentially produce arithmetic overflow or underflow, and do not have immediate operands, support optional saturation. For example, not only the dual 16-bit add (ADDR2), but also the 32-bit add (ADDR) have optional saturate. Neither the dual 16-bit instructions nor the 32-bit saturating adds and subtracts cause exceptions.

A DSP consistent with this invention includes several additional ALU instructions for DSP performance analysis. Consistent with the approach described above, each additional instruction has both a 32-bit and a dual 16-bit version. If signed overflow/underflow is possible, a saturation option is provided. These instructions are described in Table 1200 in FIGS. 12A and 12B.

Some DSPs provide a more extensive set of microcontrol functions; for example, field "set," "clear," and "extract" functions. In ATM cell processing, for example, these functions are useful in processing the cell headers. In DSPs consistent with systems and methods of the present invention, these operations can readily be executed using one or more RISC operations. For example:

| | | |
|---|---|---|
| and | r3, r2, r1 (mask) | // clears a field specified in the mask |
| or | r3, r2, r1 (mask) | // sets a field specified in the mask |
| sll | r3, r3, n | // extracts the field between [31 − n: 31 − (n + m)] |
| srl(sra) | r3, r3, m | // the field is right-justified and 0 (sign) extended if // srl (sra) is selected. |

FIGS. 13A and 13B contain Table 1300 that lists and describes additional ALU operations. Several instructions allow conditional execution of Conditional Move (CMV<COND>).

A number of DSPs and RISC processors have deployed extensive conditional execution. In these processors, the branch prediction penalty is three cycles or more. Conditional execution can mitigate the effect of the branch prediction penalty by allowing bypassing of the branch in some cases. Conditional execution is a costly alternative, however, because it uses instruction opcode bits and consequently limits the size of immediates and/or limits the number of general purpose registers visible to the program. The branch prediction penalty in the DSP of the present invention, however, only requires two cycles; therefore the value of conditional execution is minimized and only a restricted set of "conditional move" instructions is needed. The effect of any conditional execution can be "emulated," however, with a sequence of two instructions by using the conditional move. For example:

Processor with conditional execution:

Inst 1: ALU operation sets condition flags

Inst 2: COND: ALU operation

In the DSP consistent with this invention:
 Inst 1: ALU operation updates register rB (condition setting operation)
 Inst 2: ALU operation with result directed to temp register rA
 Inst 3: CMV<COND>rD, rA, rB If rB satisfies the COND, rD is updated with rA; i.e. the 2nd ALU operation is executed to "completion." This sequence is interruptible. The if-then-else construct:
 if (rB COND)
 rD=rA
 else
 rD=rC can be coded if the previous example is prefaced with:
 MOVE rD, rC //move rC to rD This conditional move facilitates initial porting of assembler code from processors with conditional execution. Table 1400 in FIG. 14 lists conditional operations consistent with this invention.

7. Zero Overhead Loop Facility

DSP algorithms spend much of their time in short real-time critical code loops. To compensate, DSPs often include hardware support for "zero-overhead looping." Zero-overhead looping allows branching from the end-to-beginning of the loop can be accomplished without explicit program overhead if the loop is to be executed a fixed number of times, known at compile time. Typically, loop counters and program start and/or end address registers are required. Zero-overhead looping cannot be nested without additional hardware. Often, zero-overhead loops cannot be interrupted.

A DSP hardware configuration consistent with the disclosed embodiment supplies such a facility but allows the loop count to be determined at run time as well. The facility consists of three Radiax registers, which are accessible by a program running in User mode using Radiax instructions MFRU and MTRU. The operating system should consider these registers as part of the context of the executing process and should save and restore them in the case of an interrupt.

These three registers include:
 LPE0[31:2]—maintaining a virtual address of the ending instruction of the loop;
 LPS0[28:2]—holding low order bits of the virtual address of the "starting" instruction of the loop; and
 LPC0[15:0]—holding the loop count value.

Although this feature is intended to operate in loops, the algorithm executed by the hardware can be described more simply. In particular, it should be noted that there is no knowledge of being "inside" the loop. All that matters is the contents of the three registers when an attempt is made to execute the instruction at the address specified by LPE0:

---
If (M32-mode, AND current-instruct-addr[31:2] = LPE0, AND LPC0 ≠ 0) then
 execute current instruction (at LPE0[31:2] || 00),
 decrement LPC0[15:0] by one,
 execute instruction at LPE0[31:29] || LPS0[28:2] || 00
 continue (LPS0 could be a jump/branch)
Else
 execute current instruction,
 continue (current instruction could be a jump/branch)
---

In this embodiment, the order of loading the registers should be LPS, then LPE, then LPC with a non-zero value.

Further, there should be at least two (2) instructions between the instruction that loads LPC with a non-zero value, and the instruction at the LPE address. To guarantee that no stall cycles are incurred, at least six (6) instructions should separate the instruction that loads LPC with a non-zero value, and the instruction at the LPE address.

8. Cycle-by-cycle Usage for Dual MAC Instructions

As explained above, a Dual MAC architecture eliminates programming hazards for its instructions by stalling the pipeline when necessary. It does this both to avoid resource conflicts and to wait for results of a first instruction to be ready before attempting to use those results in a second instruction. This means that no programming restrictions are needed to obtain correct results from a sequence of Dual MAC instructions.

The most efficient use of the hardware, however, occurs when the program avoids these stalls, usually by properly scheduling the instructions. Table 1500 in FIG. 15 lists the cycles required between instructions to assist in such scheduling. Specifically, Table 1500 indicates the number of cycles that must be inserted between the first indicated instruction and the second indicated instruction. The number "0" means that the two instructions can be issued back-to-back. If the instructions are issued back to back, the Dual MAC architecture will stall the pipeline for the indicated number of cycles. Non-Dual MAC instructions can be issued to occupy those cycles, or other appropriate Dual MAC instructions can be issued in those cycles, such as those using non-conflicting accumulators.

The following code sequences indicate the most efficient use of the Dual MAC for coding the inner loop of some common DSP algorithms. The algorithms are presented for 16-bit operands with 16-bit results, as well as 32-bit operands with 32-bit results. The algorithms assume that fractional arithmetic is used. Therefore, for the 32-bit results of a 32×32 multiply, only the HI half of the target accumulator pair is retrieved or used.

In these examples, only the Dual MAC instructions are shown. The other pipe is used to fetch and store operands and take care of loop housekeeping functions. The loops may need to be unrolled to take full advantage of the multiple Dual MAC accumulators.

Case 1: 16-bit Inner Product SUM=SUM+Ai*Bi

Assuming packed operands, two multiply-adds per cycle:

| | | | |
|---|---|---|---|
| MADDA2 | m0, | r1, | r2 |
| MADDA2 | m0, | r3, | r4 |
| MADDA2 | m0, | r5, | r6 |
| MADDA2 | m0, | r7, | r8 |
| ... | | | |

Case 2: 16-bit vector product loop. Ci=Ai*Bi

Assuming packed fractional operands, two multiplies per two cycles using two accumulator pairs.

| | | | |
|---|---|---|---|
| MULTA2 | m0, | r1, | r2 |
| MFA2 | m1, | r8 | |
| MULTA2 | m1, | r3, | r4 |
| MFA2 | m0, | r7 | |
| ... | | | |

Case 3: 16-bit complex vector product. Ci=Ai *complex Bi
Assuming fractional operands packed as 16-bit real, 16-bit imaginary. One complex multiply every two cycles using two accumulator pairs.

| CMULTA | m0, | r1, | r2 |
|---|---|---|---|
| MFA2 | m1, | r8 | |
| CMULTA | m1, | r3, | r4 |
| MFA2 | m0, | r7 | |
| ... | | | |

Case 4: 32-bit inner product loop: SUM=SUM+Ai*Bi
Assuming a multiply-add every other cycle using one accumulator.

| MADDA | m0, | r1, | r2 |
|---|---|---|---|
| non-DualMAC op | | | |
| MADDA | m1, | r3, | r4 |
| non-DualMAC op | | | |

Case 5: 32-bit vector product loop. Ci=Ai*B1
Assuming fractional 32-bit operands so that the MFA waits for the HI result of the MULTA. Achieves one multiply per two cycles using all the accumulators.

| MULTA | m0, | r1, | r2 |
|---|---|---|---|
| MFA | r9, | m1h | |
| MULTA | m1, | r3, | r4 |
| MFA | r10, | m2h | |
| MULTA | m2, | r5, | r6 |
| MFA | r11, | m3h | |
| MULTA | m3, | r7, | r8 |
| MFA | r12, | m0h | |

Case 6: 32-bit complex vector product. Ci=Ai *complex Bi
Assuming fractional 32-bit operands so that the ADDMA/SUBMA waits for the HI result of the second MULTA. Achieves one complex multiply per ten cycles using all the accumulators, with two inserted instructions. This is a good example of the cycles needed from MULTA to SUBMA/ADDMA (5 cycles for HI) and from SUBMA/ADDMA to MFA (2 cycles).

| MULTA | m0, r1, r4 | ; m[2i] | * | b[2i + 1] |
|---|---|---|---|---|
| MFA | rigmag, a1h | | | |
| MULTA | m1, r2, r3 | ; m[2i + 1] | * | b[2i] |
| SUBMA | m3h, m2h, a3h | ; | | c[2i − 2] = m[2i − 2] * b[2i − 2] − m[2i − 1] * b[2i − 1] |
| non-DualMac | op | | | |
| MULTA | m2, r1, r3 | ; m[2i] | * | b[2i] |
| MFA | rreal, m3h | | | |
| MULTA | m3, r2, r4 | ; m[2i + 1] | * | b[2i + 1] |
| ADDMA | m1h, m0h, | ; | | c[2i + 1] = a[2i + 1] * b[2i] + a[2i] * b[2i + 1] |
| | m1h | | | |

9. Low-overhead Interrupts

The DSP consistent with this invention accommodates eight low-overhead hardware interrupt signals that are useful for real-time applications. These Interrupts are supported with three coprocessor 0 registers: ESTATUS (0) 1610, ECAUSE (0) 1620, and INTVEC (0) 1630, which are illustrated in FIG. 16.

ESTATUS register 1610 contains the mask bits IM[15–8] for the low priority interrupt signals. IM[15–8] is reset to 0 so that, regardless of the global interrupt enable, IEc, none of the interrupts will be activated. IP[15–8] for the interrupt signals is located in ECAUSE 1620. Each of these fields are similar to IM and IP defined in the R3000 Exception Processing model. One difference is that the interrupts are prioritized in hardware and each have a dedicated Exception Vector.

IP[15] has the highest interrupt priority, IP[14] next, etc. All new interrupts are higher priority than IP[0–7]. The Exception vector for the interrupts is located in INTVEC register 1630. The BASE for these vectors is program-defined. The vector for IP[15] is BASE||111000||, for IP[14] BASE ||110000||, etc. Thirty-two instructions can be executed at each vector; if more are required the program can jump to any address.

10. Operational Codes

DSP architecture consistent with this invention allows for an extension of a standard instruction set by designating a single I-Format as "LEXOP," then using the INST[5:0] "subop" field to permit up to 64 additional opcodes. Thus, the additional DSP opcodes model the MIPS "special" opcodes encoded in R-Format. The diagrams in FIGS. 17A–H illustrate an example of the type of opcode extensions the present invention can designate. In this example, a "LEXOP" designation code with an I-Format 011_111 is used. Additional DSP opcodes can be integrated into an established MIPS instruction set by using a relocatable code to designate 64 subops.

In the present embodiment, the default object code for LEXOP is 011_111. However, the location can be moved using power/ground straps, for example. These straps or similar configurable devices help insure compatibility of the DSP extensions with future MIPS ISA extensions. The code assigned to "LEXOP" can be moved around with external power/ground straps to insure long-term compatibility of the DSP extensions with the MIPS ISA.

The following principles are used to resolve potential ambiguity of encoding between the DSP of the present invention extensions and instructions:

a. Instructions with similar operations to an existing MIPS instruction set, but with additional operands permitted, are programmed with additional Assembler mnemonics and encoded as a LEXOP. For instance:

| multa | m1, r1, r2 | is encoded as a LEXOP instruction |
|---|---|---|
| mult | r1, r2 | is encoded as a MIPS instruction |
| multa | m0, r1, r2 | is encoded as a LEXOP instruction (a0 is an alias for HI/LO). | b. If a MIPS instruction is "extended" with additional functionality, it is programmed with additional Assembler mnemonics and encoded as a LEXOP. In the disclosed example, mnemonics ending in "r" indicate general register file targets; mnemonics ending in "m" indicate accumulator register targets. This convention removes ambiguity between the Lexra op and a similar MIPS op. For example,

| addr | r3, r1, r2 | is encoded as a LEXOP instruction |
|---|---|---|
| add | r3, r1, r2 | is encoded as a MIPS instruction |

The MIPS add and the LEXOP addr are both signed 32-bit additions. However, on overflow the MIPS instruction triggers the Overflow Exception, while the LEXOP does not. Alternatively, the result of the LEXOP will saturate if the ".s" option is selected (addr.s).

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A circular buffer control circuit, comprising
   a first number of circular buffer start registers;
   a first number of circular buffer end registers, each associated with a different one of the circular buffer start registers; and
   circular buffer control logic including
      means for comparing a pointer to a first address stored in a selected one of the circular buffer end registers, and
      means for restoring to a register file a second address stored in the one of the circular buffer start registers associated with the selected circular buffer end register, if the pointer matches the first address stored in the selected circular buffer end register.

2. The circular buffer control circuit of claim 1, wherein the circular buffer control logic further includes
   means for modifying the pointer by a stride value.

3. The circular buffer control circuit of claim 2, wherein the stride value is programmable.

4. A circular buffer control circuit, comprising
   a first number of circular buffer start registers;
   a first number of circular buffer end registers, each associated with a different one of the circular buffer start registers; and
   control logic that compares a pointer to a first address stored in a selected one of the circular buffer end registers and restores to a register file a second address stored in the one of the circular buffer start registers associated with the selected circular buffer end register, if the pointer matches the first address stored in the selected circular buffer end register.

5. The circular buffer control circuit of claim 4, wherein the control logic modifies the pointer by a stride value.

6. The circular buffer control circuit of claim 5, wherein the stride value is programmable.

7. A digital signal processor, comprising:
   a register set; and
   means for executing a loop of instructions a specified number of times determined by a loop count value, including
      first means for executing a first instruction specified by address bits stored in a first portion of a first register of the register set,
      second means for decrementing the loop count value stored in a second register of the register set, and
      third means for executing a second instruction specified by address bits stored in a second portion of the first register and a third register of the register set.

8. The digital signal processor of claim 7, further including means for exiting the loop of instructions when the loop count value equals zero.

9. A digital signal processor, comprising:
   a register set; and
   control logic that executes a loop of instructions a specified number of times determined by a loop count value, wherein the control logic
      executes a first instruction specified by address bits stored in a first portion of a first register of the register set,
      decrements the loop count value stored in a second register within of the register set, and
      executes a second instruction specified by address bits stored in a second portion of the first register and a third register of the register set.

10. The digital signal processor of claim 9, wherein the control logic exits the loop of instructions when the loop count value equals zero.

* * * * *